United States Patent
Terai

(10) Patent No.: US 12,122,152 B2
(45) Date of Patent: Oct. 22, 2024

(54) CONVEYOR AND LIQUID DISCHARGE APPARATUS

(71) Applicant: Junichi Terai, Kanagawa (JP)

(72) Inventor: Junichi Terai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 56 days.

(21) Appl. No.: 17/960,834

(22) Filed: Oct. 6, 2022

(65) Prior Publication Data

US 2023/0150282 A1     May 18, 2023

(30) Foreign Application Priority Data

Nov. 17, 2021    (JP) ................................. 2021-187114

(51) Int. Cl.
    *B41J 15/04*         (2006.01)
    *B41J 11/00*         (2006.01)
    (Continued)

(52) U.S. Cl.
    CPC ......... *B41J 15/048* (2013.01); *B41J 11/0095* (2013.01); *B41J 19/205* (2013.01);
    (Continued)

(58) Field of Classification Search
    CPC .... B41J 15/048; B41J 11/0095; B41J 19/205; B41J 2203/011; B65H 5/06; B65H 7/08;
    (Continued)

(56) References Cited

U.S. PATENT DOCUMENTS 11,148,441 B1    10/2021    D'Armancourt et al.
2005/0185229 A1    8/2005    Sano et al.
(Continued)

FOREIGN PATENT DOCUMENTS

EP       2492225 A1     8/2012
EP       3275675 A1 *   1/2018  ......... B41J 11/0095
(Continued)

OTHER PUBLICATIONS

Extended European Search Report issued Apr. 3, 2023 in corresponding European Patent Application No. 22197416.5, 10 pages.

*Primary Examiner* — Henok D Legesse
(74) *Attorney, Agent, or Firm* — XSENSUS LLP

(57) ABSTRACT

A conveyor includes a conveyance roller to convey a conveyed object, a pair of roller supports opposing to each other and supporting both ends of the conveyance roller in an axial direction thereof, a position sensor to detect a position of the conveyed object, and a sensor support supporting the position sensor. Each of the pair of roller supports has an insertion hole into which the sensor support is inserted. The insertion hole determines a position of the sensor support in a direction intersecting an insertion direction of the sensor support. The sensor support includes a positioning portion determining the position of the sensor support with respect to at least one of the pair of roller supports. The positioning portion determines the position of the sensor support in the insertion direction, a direction opposite to the insertion direction, and a rotational direction about an axis along the insertion direction.

15 Claims, 12 Drawing Sheets

(51) Int. Cl.
  *B41J 19/20* (2006.01)
  *B65H 7/14* (2006.01)
  *H04N 1/00* (2006.01)
  B65H 5/06 (2006.01)
  B65H 7/08 (2006.01)
  G03G 15/00 (2006.01)

(52) U.S. Cl.
  CPC .......... *B65H 7/14* (2013.01); *H04N 1/00702* (2013.01); *B41J 2203/011* (2020.08); *B65H 5/06* (2013.01); *B65H 7/08* (2013.01); *B65H 2402/30* (2013.01); *B65H 2402/60* (2013.01); *B65H 2553/42* (2013.01); *B65H 2553/80* (2013.01); *B65H 2801/06* (2013.01); *G03G 15/5029* (2013.01); *G03G 15/6517* (2013.01); *G03G 2215/00721* (2013.01)

(58) Field of Classification Search
  CPC ............ B65H 2402/30; B65H 2402/60; B65H 2553/42; B65H 2553/80; B65H 7/14; B65H 2801/06; G03G 15/5029; G03G 15/6517; G03G 2215/00721; H04N 1/00702
  See application file for complete search history.

(56) References Cited

U.S. PATENT DOCUMENTS

| | | | |
|---|---|---|---|
| 2013/0334769 | A1 | 12/2013 | Yamazaki |
| 2017/0087862 | A1 | 3/2017 | Kuronuma et al. |
| 2018/0236794 | A1 | 8/2018 | Mizuno et al. |
| 2018/0345699 | A1* | 12/2018 | Hojo ........................ B41J 2/325 |

FOREIGN PATENT DOCUMENTS

| | | |
|---|---|---|
| JP | 2017-146541 | 8/2017 |
| JP | 2018-020557 | 2/2018 |
| JP | 2018-130956 | 8/2018 |
| JP | 2018-171790 | 11/2018 |

* cited by examiner

CONVEYOR AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2021-187114, filed on Nov. 17, 2021, in the Japan Patent Office, the entire disclosure of which is hereby incorporated by reference herein.

BACKGROUND

Technical Field

Embodiments of the present disclosure relate to a conveyor and a liquid discharge apparatus.

Related Art

An inkjet image forming apparatus as a liquid discharge apparatus discharges ink onto a sheet such as paper to form an image.

In an inkjet image forming apparatus, if the position of a sheet conveyed by a conveyance roller or the like deviates from an intended position, the position of ink landing on the sheet also deviates, which degrades image quality. In order to inhibit the positional deviation of the ink with respect to the sheet, there are image forming apparatuses that include a position detector such as an optical sensor that detects the position (positional deviation) of the sheet.

SUMMARY

In one aspect, a conveyor includes a conveyance roller to convey a conveyed object, a pair of roller supports opposing to each other and supporting both ends of the conveyance roller in an axial direction of the conveyance roller, a position sensor to detect a position of the conveyed object, and a sensor support supporting the position sensor. Each of the pair of roller supports has an insertion hole into which the sensor support is inserted. The insertion hole determines a position of the sensor support in a direction intersecting an insertion direction of the sensor support. The sensor support includes a positioning portion determining the position of the sensor support with respect to at least one of the pair of roller supports. The positioning portion determines the position of the sensor support in the insertion direction, a direction opposite to the insertion direction, and a rotational direction about an axis alone the insertion direction.

In another aspect, a liquid discharge apparatus includes the conveyor described above; and a liquid discharge head to discharge a liquid onto the conveyed object conveyed by the conveyor.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
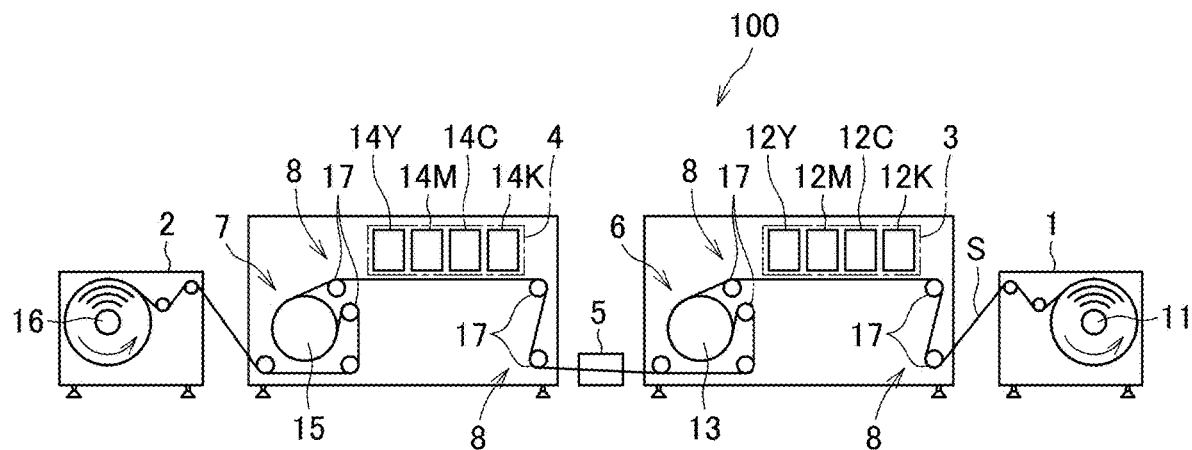
FIG. 1 is a schematic diagram illustrating an overall configuration of an inkjet image forming apparatus according to one embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to drawings, descriptions are given below of embodiments of the present disclosure. In the drawings illustrating embodiments of the present disclosure, elements or components having identical or similar functions or shapes are given similar reference numerals as far as distinguishable, and redundant descriptions are omitted.

Figure 2:
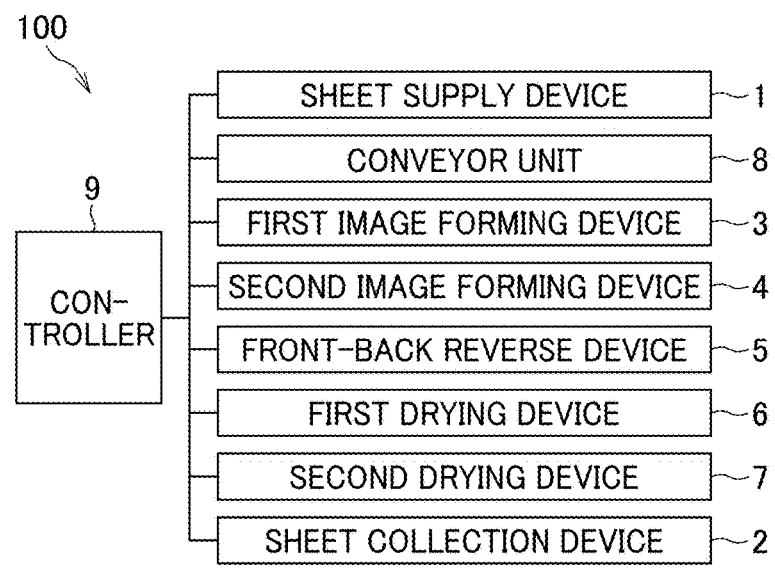
FIG. 2 is a block diagram of a control system of the inkjet image forming apparatus according to one embodiment.

First, a configuration of an inkjet image forming apparatus, which is an example of a liquid discharge apparatus according to an embodiment of the present disclosure, is described with reference to FIGS. 1 and 2. FIG. 1 is a diagram illustrating an overall configuration of an inkjet image forming apparatus 100, and FIG. 2 is a diagram illustrating a control system of the inkjet image forming apparatus 100 (hereinafter simply referred to as the "image forming apparatus 100").

As illustrated in FIG. 1, the image forming apparatus 100 according to the present embodiment includes a sheet supply device 1 that supplies a sheet S for image formation, a conveyor unit 8 that conveys the supplied sheet S, a first image forming device 3 that forms an image on a front side of the sheet S, a second image forming device 4 that forms an image on a back side of the sheet S, a front-back reverse device 5 that reverses the sheet S to turn upside down, a first drying device 6 and a second drying device 7 that dry the sheet S, and a sheet collection device 2 that collects the sheet S on which an image has been formed. The image forming apparatus 100 according to the present embodiment further includes a controller 9 (see FIG. 2) that controls the sheet supply device 1, the conveyor unit 8, the first image forming device 3, the second image forming device 4, the front-back reverse device 5, the first drying device 6, the second drying device 7, and the sheet collection device 2.

The sheet supply device 1 includes a supply roller 11 on which a long sheet S is wound in a roll shape. The supply roller 11 is rotatable in the direction indicated by an arrow appended to the supply roller 11 in FIG. 1, and the sheet S is fed from the supply roller 11 as the supply roller 11 rotates.

The conveyor unit 8 includes a plurality of conveyance devices 20 (see FIG. 4) each having a plurality of conveyance rollers 17. The sheet S is stretched over the conveyance rollers 17, and the sheet S is conveyed by rotation of the conveyance rollers 17. The conveyance roller may be a pipe, a shaft, or the like having a circular cross section.

The first image forming device 3 includes a plurality of head units 12Y, 12M, 12C, and 12K (also collectively "head units 12") that discharges liquid ink onto the sheet S. Each of the head units 12 discharges ink onto the front side of the sheet S to form an image thereon according to, of image data generated by the controller 9, image data representing the image to be formed on the front side of the sheet S. The ink is a liquid containing a colorant, a solvent, and crystalline resin particles dispersed in the solvent. Crystalline resin is a resin that melts to changes a phase thereof from a crystal phase to a liquid phase when heated above a melting point thereof.

The first drying device 6 includes a heating drum 13 that heats the sheet S to dry the ink on the sheet S. The heating drum 13 has a cylindrical shape and rotates while the sheet S is wound around the outer circumferential surface thereof.

The heating drum 13 includes a heating source such as a halogen heater disposed therein. The heating drum 13 is disposed below a conveyance path along which the sheet S is conveyed. In other words, the heating drum 13 is on the back side of the sheet S. When the sheet S is conveyed from the first image forming device 3, the bottom face (back side) of the sheet S contacts the outer circumferential surface of the heating drum 13. The heating drum 13 conveys the sheet S while heating the sheet S. Accordingly, the drying of the ink on the sheet S is promoted. The rotation speed of the heating drum 13 at this time is controlled by the controller 9 to be substantially the same as the conveyance speed of the sheet supply device 1, the sheet collection device 2, the conveyor unit 8, and the like. Such control prevents detective conveyance direction of the sheet S being conveyed, such as slipping of the sheet S on the outer circumferential surface of the heating drum 13 in the direction in which the sheet S is conveyed (i.e., a sheet conveyance direction).

The front-back reverse device 5 has a known structure to reverse the sheet S to turn the sheet S upside down. When the sheet S conveyed from the first drying device 6 passes through the front-back reverse device 5, the sheet S is turned upside down and sent to the second image forming device 4. That is, when the sheet S is conveyed with the front side facing up to the front-back reverse device 5, the sheet S is reversed so that the front side faces down (the back side faces up).

The second image forming device 4 has a structure similar to that of the first image forming device 3 and includes a plurality of head units 14Y, 14M, 14C, and 14K that discharges ink. The second image forming device 4 forms an image on the back side of the sheet S. That is, since the sheet S is conveyed to the second image forming device 4 after the sheet S is reversed (turned upside down) by the front-back reverse device 5, the second image forming device 4 discharges ink onto the back side of the sheet S to form an image thereon according to, of the image data generated by the controller 9, image data representing the image to be formed on the back side of the sheet S.

Similar to the first drying device 6, the second drying device 7 includes a heating drum 15 that heats the sheet S. As illustrated in FIG. 1, similar to the heating drum 13 of the first drying device 6, the heating drum 15 of the second drying device 7 is disposed below the conveyance path. Since the sheet S is reversed (turned upside down), the front side of the sheet S contacts the outer circumferential surface of the heating drum 15. Even if the front side of the sheet S bears an image (ink is applied thereto), the ink has already been dried by the first drying device 6. Accordingly, the image on the front side is not disturbed by the contact with the heating drum 15.

The sheet collection device 2 includes a collection roller 16 that winds and collects the sheet S. The collection roller 16 is rotatable in the direction indicated by an arrow appended thereto in FIG. 1, and the sheet S is wound in a roll shape around the collection roller 16 as the collection roller 16 rotates. The sheet collection device 2 may include a post-processing unit that performs post-processing such as cutting the sheet S to a predetermined length and aligning the cut sheet S.

The controller 9 is implemented by an information processing apparatus such as a personal computer (PC). The controller 9 generates image data representing images to be formed on the front side and the back side of the sheet S, and controls various operations of the sheet supply device 1, the first image forming device 3, the second image forming device 4, the front-back reverse device 5, the first drying device 6, the second drying device 7, and the sheet collection device 2. For example, the controller 9 controls, in addition to the rotation speeds of the supply roller 11, the collection roller 16, and the conveyance rollers 17, the temperatures of the heating sources that heat the heating drums 13 and 15.

Figure 3:
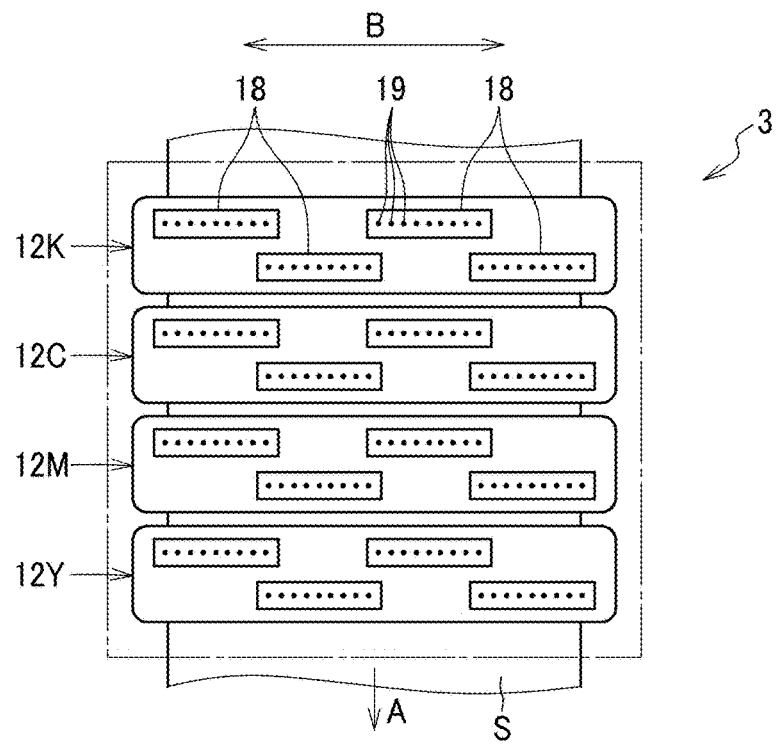
FIG. 3 is a plan view of an image forming device according to one embodiment.

Next, with reference to FIG. 3, a description is given of the configuration of the image forming devices according to the present embodiment. In the present embodiment, the first image forming device 3 and the second image forming device 4 has similar configurations. Accordingly, the configuration of the first image forming device 3 is described, and the description of the configuration of the second image forming device 4 is omitted.

As illustrated in FIG. 3, in the first image forming device 3 according to the present embodiment, the four head units 12K, 12C, 12M, and 12Y that discharge black (K), cyan (C), magenta (M), and yellow (Y) inks, respectively, are disposed in that order from the upstream side in the direction indicated by arrow A (hereinafter "sheet conveyance direction A") in which the sheet S is conveyed. The order of the head units 12K, 12C, 12M, and 12Y of the respective colors is not limited to the illustrated order. The color of the ink to be used may be a color other than yellow, magenta, cyan, and black.

Each of the head units 12K, 12C, 12M, and 12Y includes four liquid discharge heads 18. Each liquid discharge head 18 has a plurality of nozzles 19 and discharges ink (liquid) onto the sheet S from each nozzle 19. The liquid discharge heads 18 are alternately arranged to cover an image formation area of the sheet S entirely in the width direction of the sheet S. When the sheet S is conveyed to the position facing the head units 12K, 12C, 12M, and 12Y, the liquid discharge heads 18 discharge ink, and an image is formed on the sheet S.

In this specification, the term "width direction" of the sheet S is a direction parallel to a conveyance plane on which the sheet is conveyed and orthogonal to the sheet conveyance direction A. The width direction is indicated by arrow B FIG. 3. Further, the term "conveyance plane" is a plane through which the conveyed sheet passes. The conveyance plane includes, for example, an imaginary plane connecting contact portions between the sheet and a plurality of conveyance rollers to convey the sheet, or a face of a conveyance belt on which the sheet is placed and conveyed. The "width direction" of the sheet may be referred to "sheet width direction" in the following description.

Figure 4:
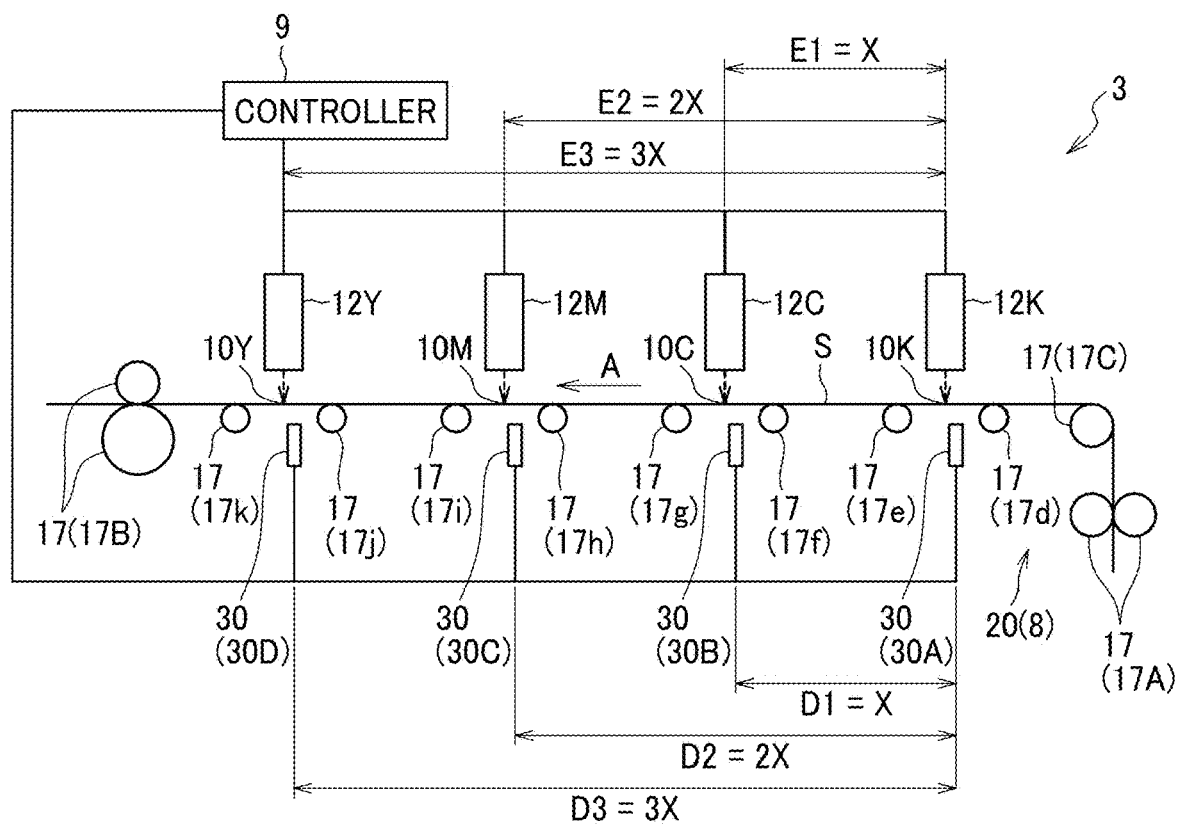
FIG. 4 is a side view of a conveyance device according to one embodiment.

With reference to FIG. 4, a description is given of a configuration of the conveyance device 20 (serving as a conveyor) of the conveyor unit 8 disposed in the first image forming device 3.

As illustrated in FIG. 4, the conveyance device 20 includes the plurality of conveyance rollers 17. The plurality of the conveyance rollers 17 illustrated in FIG. 4 includes drive roller pairs 17A and 17B, a drive roller 17C, and a plurality of driven rollers 17d to 17k. The drive roller pair 17A disposed extreme upstream in the sheet conveyance direction A and the drive roller pair 17B disposed extreme downstream in the sheet conveyance direction A are two drive roller pairs that convey the sheet S while sandwiching the sheet S from the front side and the back side. In addition to the drive roller pairs 17A and 17B (drive roller pairs), the drive roller 17C not paired with another roller) disposed adjacent to and downstream from the upstream drive roller pair 17A conveys the sheet S.

The plurality of driven rollers 17d to 17k is disposed between the drive roller 17C on the upstream side and the drive roller pair 17B on the downstream side. Instead of the driven rollers 17d to 17k, a plurality of drive rollers may be disposed. In FIG. 4, the head units 12K, 12C, 12M, and 12Y discharge ink at liquid discharge positions 10K, 10C, 10M, and 10Y (also collectively "liquid discharge positions 10"), respectively. The driven rollers 17d to 17k are disposed such that each liquid discharge position 10 is interposed between two of the driven rollers 17d to 17k in the sheet conveyance direction. With the arrangement in which the driven rollers 17d to 17k are respectively disposed on upstream and downstream from the liquid discharge positions 10K, 10C, 10M, and 10Y, fluttering of the sheet S particularly at the liquid discharge positions 10K, 10C, 10M, and 10Y is inhibited, and the sheet S can be stably conveyed.

Figure 5:
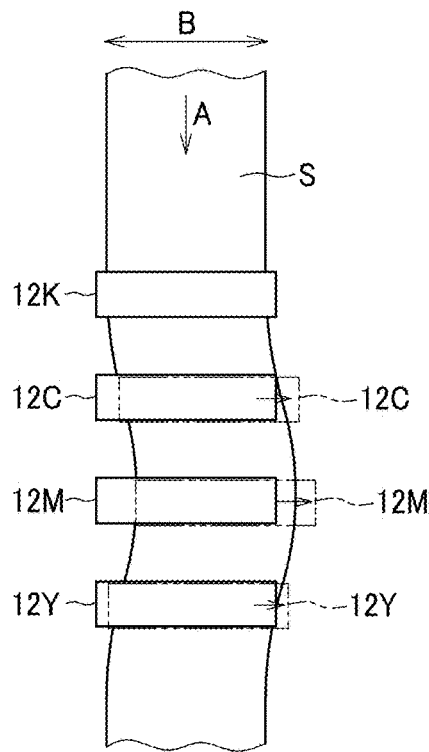
FIG. 5 is a plan view of an example in which a conveyed sheet meanders.

When the conveyance roller 17 is eccentric or thermally expanded, as illustrated in FIG. 5, the conveyed sheet S may be displaced in the width direction indicated by arrow B, and the sheet S may be conveyed in a meandering manner. When such meandering of the sheet S occurs, the position of the ink landing on the sheet S also deviates, and image quality deteriorates. Therefore, in the present embodiment, in a case where meandering of the sheet S occurs, the head units 12C, 12M, and 12Y for cyan, magenta, and yellow are movable in the width direction of the sheet S indicated by arrow B, so as to follow the meandering (positional deviation in the width direction). In FIG. 5, chain double-dashed lines indicate the move of the head units 12C, 12M, and 12Y.

In order to move the head units 12C, 12M, and 12Y to follow the meandering of the sheet S, it is necessary to grasp a positional deviation (the direction in which the position deviates and the amount of deviation) in the width direction indicated by arrow B of the sheet S. For that, as illustrated in FIG. 4, the conveyance device 20 according to the present embodiment is provided with a plurality of position sensors 30 (first to fourth position sensors 30A to 30D) serving as a position detector to detect the position of the sheet S.

Each position sensor 30 is disposed opposite the corresponding head unit 12 (on the lower side of the sheet S in FIG. 4) relative to the conveyance path through which the sheet S is conveyed, and in the vicinity of the liquid discharge position 10 at which the head unit 12 discharges ink. That is, each position sensor 30 is disposed between, out of the driven rollers 17d to 17k, two driven rollers respectively disposed upstream and downstream from the corresponding one of the liquid discharge positions 10K, 10C, 10M, and 10Y. The "liquid discharge position" in this specification refers to a liquid discharge position in a state where the sheet does not meander, that is, a state where the head unit does not move in the sheet width direction and is disposed at a reference position (initial position) set in advance.

The position sensor 30 is an optical sensor or the like that detects surface information of a conveyed object to be conveyed. Examples include a charge-coupled device (CCD) camera and a complementary metal oxide semiconductor (CMOS) camera using air pressure, photoelectricity, ultrasonic wave, or light such as visible light, laser, or infrared light.

Figure 6:
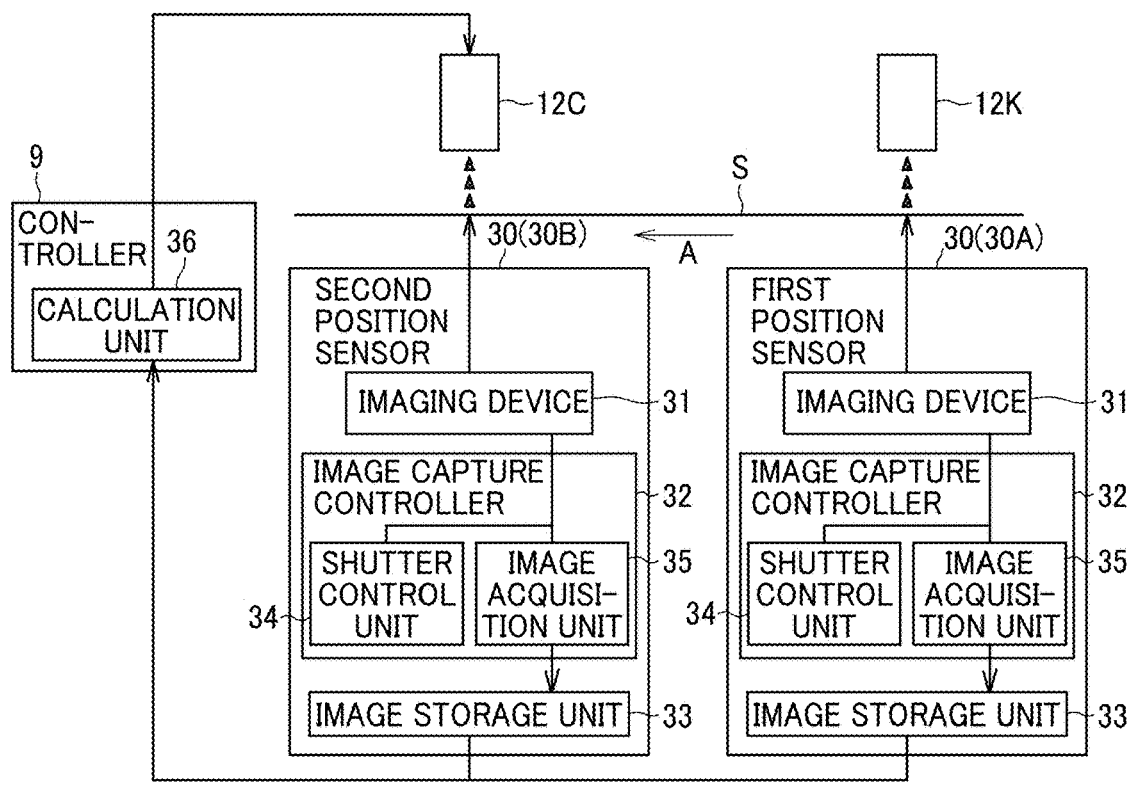
FIG. 6 is a block diagram illustrating a control system of position sensors and head units according to one embodiment.

FIG. 6 is a block diagram illustrating a control system of the position sensors and the head units according to the present embodiment. With reference to FIG. 6, a description is given below of control of the position sensors 30 and the head units 12 using an example of a combination of the first position sensor 30A and the second position sensor 30B. The first position sensor 30A detects the position of the sheet S at the position of the head unit 12K for black. The second position sensor 30B detects the position of the sheet S at the position of the head unit 12C for cyan.

As illustrated in FIG. 6, the controller 9 includes a calculation unit 36. Each of the first position sensor 30A and the second position sensor 30B includes an imaging device 31, an image capture controller 32, and an image storage unit 33.

The imaging device 31 captures an image of the sheet S being conveyed.

The image capture controller 32 includes a shutter control unit 34 and an image acquisition unit 35. The shutter control unit 34 controls the timing at which the imaging device 31 captures an image. The image acquisition unit 35 acquires data of an image captured by the imaging device 31.

The image storage unit 33 stores the image data obtained by the image capture controller 32.

The sheet S has diffusiveness on or inside thereof. Accordingly, when the sheet S is irradiated with laser beam from a laser light source of the position sensor 30A or 30B, the reflected light is diffused. The diffuse reflection creates a pattern on the sheet S. The pattern is made of spots called "speckles" and called a "speckle pattern," which is an example of the surface information. When an image of the sheet S is captured, image data representing the speckle pattern is obtained. From the image data, the position of the pattern is known, and the position of a specific portion of the sheet S is detected.

That is, when the sheet S is conveyed, the pattern of the sheet S is also conveyed. Therefore, by detecting the same pattern at different times, the movement amount or the movement speed of the sheet S can be obtained.

The image data obtained by the first position sensor 30A and image data obtained by the second position sensor 30B are sent to the calculation unit 36 of the controller 9. The calculation unit 36 calculates how much the predetermined portion on the sheet S has moved in the sheet width direction based on the image data sent from the first position sensor 30A and the second position sensor 30B. By moving the head unit 12C for cyan in the sheet width direction based on the movement amount (positional deviation amount) of the sheet S calculated by the calculation unit 36, the discharge position in the sheet width direction is controlled. In other combinations of the position sensors 30, the positional deviation of the sheet S is detected in the same manner, and the magenta and yellow head units 12M and 12Y are moved in the sheet width direction based on the detected positional deviation amount, thereby controlling the respective discharge positions in the sheet width direction.

Based on the image data obtained by each position sensor 30, in addition to the positional deviation in the sheet width direction, the positional deviation in the sheet conveyance direction is also detected. For example, the calculation unit 36 calculates how much the predetermined portion on the sheet S has moved in the sheet conveyance direction based on the image data sent from the first position sensor 30A and the second position sensor 30B, so as to calculate the positional deviation amount of the sheet S in the sheet conveyance direction. In other combinations of the position sensors 30, the positional deviation in the sheet conveyance direction is similarly detected. The sheet S may extend in the sheet conveyance direction due to permeation of the ink. In such a case, the discharge timing of each of the head units 12K, 12C, 12M, and 12Y is controlled based on the calculated positional deviation amount in the sheet conveyance direction. Thus, the discharge position in the sheet conveyance direction can be controlled.

In order to improve the detection accuracy of each position sensor 30, as illustrated in FIG. 4, each position sensor 30 is preferably disposed between rollers such as the driven rollers 17d to 17k. Since the conveyance speed of the sheet S is relatively stable between the rollers, the position sensors 30 disposed between the rollers can accurately detect the movement amount or the movement speed of the sheet S in at least one of the sheet conveyance direction and the sheet width direction.

Preferably, the position of the position sensor 30 is close to the corresponding liquid discharge position 10 where ink is discharged. That is, the shorter the distance between the position sensor 30 and the liquid discharge position 10, the smaller the detection error. Therefore, the positional deviation of the sheet S can be detected with high accuracy.

Further, the position sensor 30 is preferably disposed upstream from the liquid discharge position 10. When the position sensor 30 is disposed upstream from the liquid discharge position 10, the movement or discharge timing of the head unit 12 can be controlled after the position of the sheet S is detected by the position sensor 30 and before the sheet S is conveyed to the liquid discharge position 10.

By contrast, in a case where the position sensor 30 is disposed directly below the liquid discharge position 10, there is a concern that the landing position of the ink deviates due to a delay by the amount of the control operation. If the control operation is performed quickly, as the position of the position sensor 30, directly below the liquid discharge position 10 is preferred to upstream from the liquid discharge position 10 for accurately detecting the movement amount of the sheet S directly below the liquid discharge position 10. Alternatively, when the error by the amount of the control operation is allowable, the position sensor 30 may be disposed downstream from the liquid discharge position 10.

In the present embodiment, intervals D1 to D3 (see FIG. 4) between the position sensors 30 in the sheet conveyance direction A are set to be integral multiples of a circumferential length X of the drive roller that conveys the sheet S (for example, the lower drive roller of the drive roller pair 17B disposed extreme downstream in the sheet conveyance direction A in FIG. 4). That is, in FIG. 4, the respective distances D1 to D3 from the extreme upstream position sensor 30A to the position sensors 30B to 30D downstream from the position sensor 30A are respectively set to one, two, and three multiples of the circumferential length X of the drive roller (D1=X, D2=2X, D3=3X).

Setting the intervals D1 to D3 between the position sensors 30 to integral multiples of the circumferential length X of the drive roller is advantageous as follows. Even if the drive roller is eccentric, this setting can cancel out the speed unevenness of the sheet S due to the eccentricity at the detection positions of the position sensors 30. Therefore, each position sensor 30 can accurately detect the positional deviation of the sheet S.

Similarly, intervals E1 to E3 between the head units 12K, 12C, 12M, and 12Y in the sheet conveyance direction A are set to one, two, and three multiples of the circumferential length X of the drive roller (E1=X, E2=2X, and E3=3X). This setting can cancel out the speed unevenness of the sheet S due to the eccentricity of the drive roller at each of the liquid discharge positions 10K, 10C, 10M, and 10Y, thereby securing accurate discharge of ink from the head units 12K, 12C, 12M, and 12Y to the sheet S.

To improve the detection accuracy of each position sensor 30, the position of the position sensor 30 relative to the liquid discharge position is set as described above, and, preferably, the mounting accuracy of the position sensor is improved. For improving the mounting accuracy of the sensor, generally, there is a method of increasing the dimensional accuracy of a mounting component or performing position adjustment after mounting. However, higher accuracy of component dimensions increases the cost, and adjusting the position after mounting increases the mounting work time, which are not desirable. Therefore, in the present embodiment, the following configuration is adopted to easily and accurately mount the position sensor. Hereinafter, a sensor mounting structure according to the present embodiment will be described.

Figure 7:
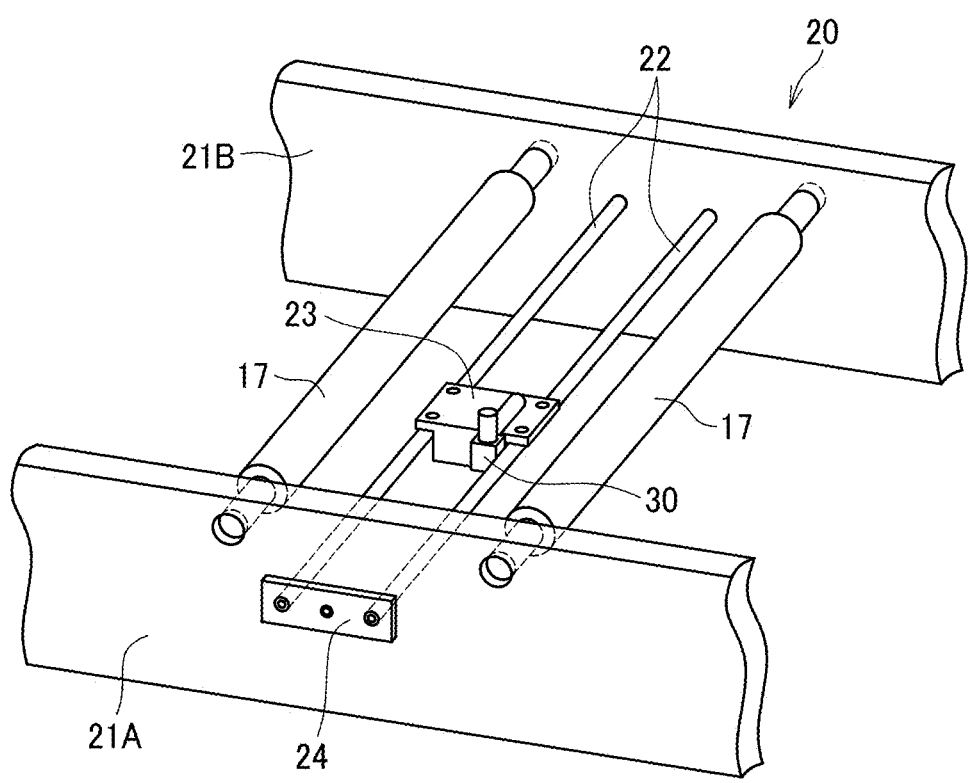
FIG. 7 is a perspective view of a sensor mounting structure according to one embodiment.

FIG. 7 is a perspective view of a part of the conveyance device 20 including the sensor mounting structure according to the present embodiment.

As illustrated in FIG. 7, the position sensor 30 is attached between a pair of side plates 21A and 21B via two support shafts 22 and a sensor holder 23. The pair of side plates 21A and 21B serves as a pair of roller supports to support both ends (or the vicinity thereof) of each of the plurality of conveyance rollers 17, The side plates 21A and 21B are disposed in parallel with each other with an interval therebetween. The sensor holder 23 holds the position sensor 30. The sensor holder 23 extends across the two support shafts 22 and is attached to the two support shafts 22. Each support shall 22 is a component of a sensor support that supports the position sensor 30 held by the sensor holder 23, and is attached between the pair of side plates 21A and 21B. On the side plate 21A, a flat fixing plate 24 serving as a fixing member that fixes each support shaft 22 is attached. The flat fixing plate 24 is another component of the sensor support. That is, the sensor support includes the pair of support shafts 22 and the fixing plate 24. As described above, the conveyance device 20 according to the present embodiment includes the pair of side plates 21A and 21B, the two support shafts 22, the sensor holder 23, and the fixing plate 24 as the sensor mounting structure for mounting the position sensor 30.

Next, a description is given of details of the sensor mounting structure and a mounting method according to the present embodiment with reference to the exploded perspective views of FIGS. 8 to 12. In the following description, of the side plates 21A and 21B illustrated in FIG. 8, the side plate 21A on the near side in the drawing is also referred to as a "first side plate 21A," and the side plate 21B on the far side is also referred to as a "second side plate 21B." In addition, the side on which the side plates 21A and 21B face each other (face a center in the sheet width direction) is referred to as an "inner side" or "opposing side." and an opposite side thereof is referred to as an "outer side."

Figure 8:
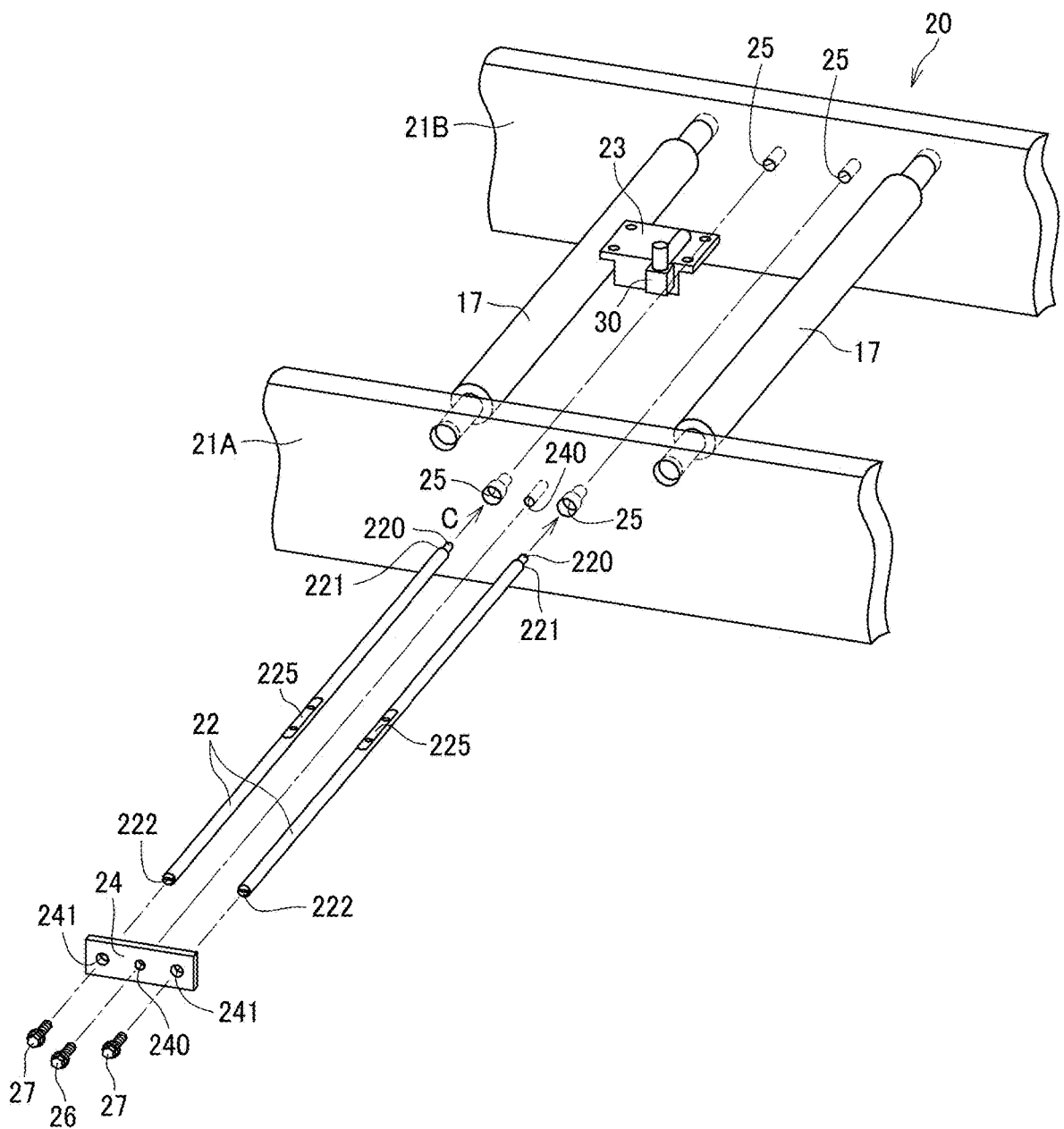
FIG. 8 is an exploded perspective view of the sensor mounting structure according to one embodiment.

As illustrated in FIG. 8, each of the first side plate 21A and the second side plate 21B has two insertion holes 25 into which the respective support shafts 22 are inserted. Each insertion hole 25 has a circular cross section. The insertion holes 25 are positioned at the same height and at the same interval so that the support shafts 22 inserted in the insertion holes 25 are horizontal and parallel to each other.

Figure 9:
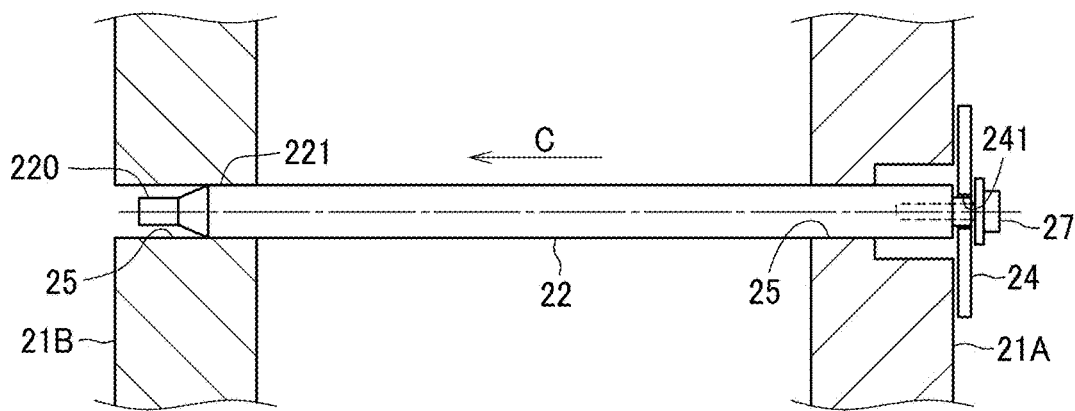
FIG. 9 is a cross-sectional view of a state in which a support shaft is attached to a pair of side plates illustrated in FIGS. 7 and 8.

As illustrated in FIG. 8, each support shaft 22 is inserted from the outer side of the first side plate 21A toward the second side plate 21B in the direction indicated by arrow C (also "insertion direction C"). A front end of each support shaft 22 in the insertion direction C includes a protruding portion 220 having a circular cross section. The protruding portion 220 is to be inserted into the insertion hole 25 of the second side plate 21B. The protruding portion 220 has a smaller diameter than other portion (a large-diameter portion 221) of the support shaft 22. As illustrated in FIG. 9, when the protruding portion 220 is inserted into the insertion hole 25 of the second side plate 21B, an end-side portion (on the protruding portion 220 side) of the large-diameter portion 221 of the support shaft 22 is also inserted into the insertion hole 25 of the second side plate 21B.

After the support shafts 22 are inserted into the insertion holes 25 of the first and second side plates 21A and 21B, the fixing plate 24 is attached to the first side plate 21A. Then, the movement of the support shafts 22 in the insertion direction C and the direction opposite thereto and the rotation of the support shafts 22 about the axes along the insertion direction C are restricted.

Figure 10:
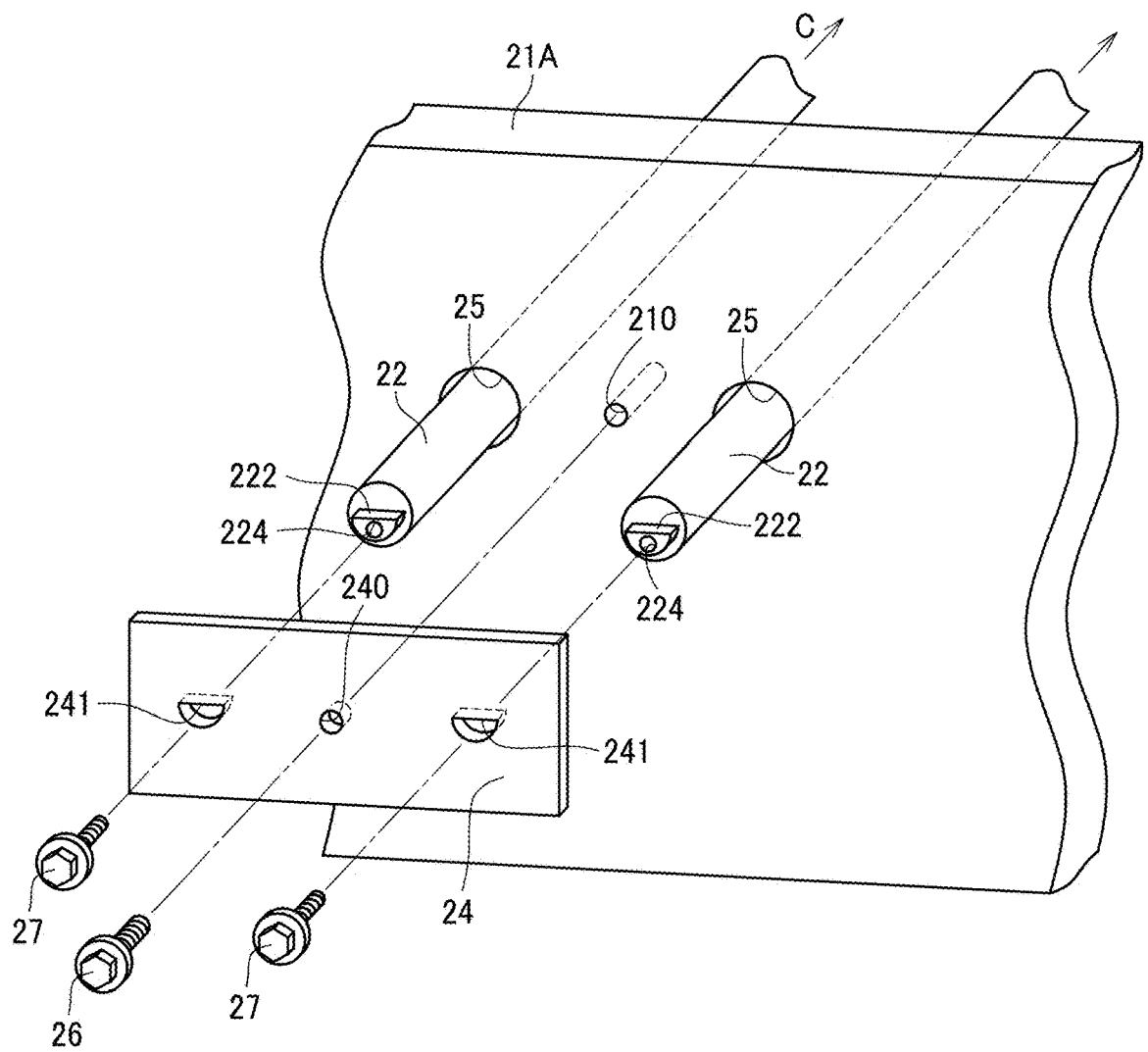
FIG. 10 is an exploded perspective view of the sensor mounting structure in a state before a fixing plate is attached, according to one embodiment.

Specifically, as illustrated in FIG. 10, a rear end (an end opposite to a front end in the insertion direction C) of each support shaft 22 includes a rotation prevention protrusion 222. The rotation prevention protrusion 222 has a D-shaped cross section and restricts rotation of the support shaft 22. Relating to this, the fixing plate 24 has fitting holes 241, each having a D-shaped cross section, into which the rotation prevention protrusions 222 of the support shafts 22 fit. As the rotation prevention protrusion 222 of the support shaft 22 is inserted and fitted into the fitting hole 241 of the fixing plate 24, the rotation of the support shaft 22 with respect to the fixing plate 24 is restricted. The shape of the cross section of the rotation prevention protrusion 222 and the fitting hole 241 is not limited to a D-shape but may be another non-circular shape such as a quadrangular shape, a polygonal shape, or an elliptical shape.

Further, as illustrated in FIG. 10, a screw hole 224 is provided in the rotation prevention protrusion 222. The support shaft 22 is screwed to the fixing plate 24 by a screw 27 inserted into the screw hole 224 from the outer side of the fixing plate 24. Further, the fixing plate 24 has a screw insertion hole 240 for attaching the fixing plate 24 to the first side plate 21A. Relating to this, the first side plate 21A has a screw hole 210 for attaching the fixing plate 24. A screw 26 is inserted into the screw insertion hole 240 of the fixing plate 24 and screwed in the screw hole 210 of the first side plate 21A. Then, the fixing plate 24 is attached to the outer face of the first side plate 21A.

As illustrated in FIG. 9, in a state in which the support shaft 22 is secured to the fixing plate 24 and the fixing plate 24 is secured to the first side plate 21A, movement of the support shaft 22 in the insertion direction C and the direction opposite thereto with respect to the first side plate 21A is restricted. Further, in this state, since the respective rotation prevention protrusions 222 of the support shafts 22 are fitted to the fitting holes 241 of the fixing plate 24, the rotation of the support shafts 22 with respect to the first side plate 21A is also restricted.

Figure 11:
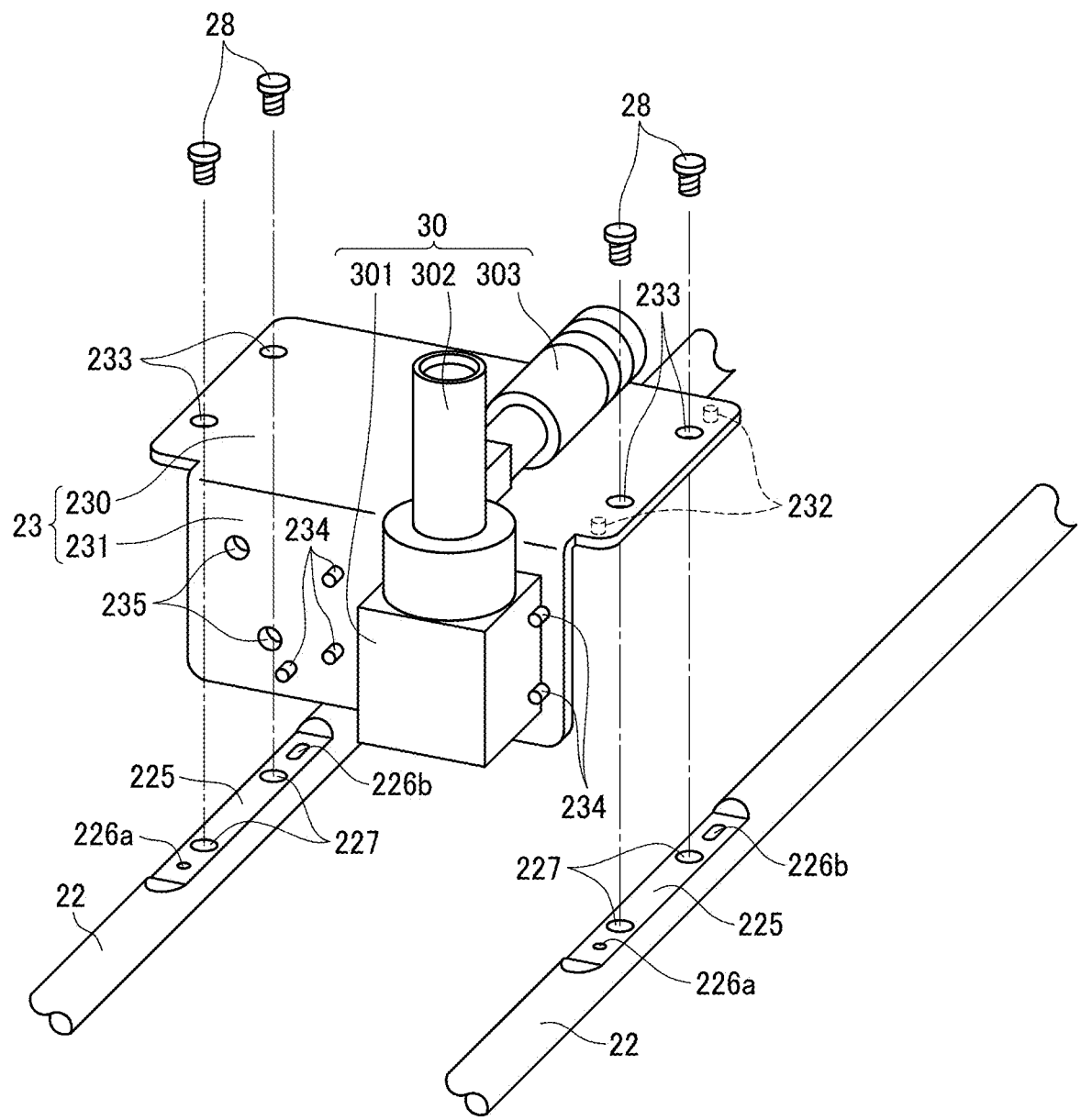
FIG. 11 is an exploded perspective view of the sensor mounting structure before a sensor holder is attached to each support shaft, according to one embodiment.

FIG. 11 is an exploded perspective view of the sensor holder 23, the position sensor 30, and the support shafts 22 in a state before the sensor holder 23 is attached to the support shafts 22.

As illustrated in FIG. 11, each support shaft 22 includes a mounting face 225 for mounting the sensor holder 23 on the surface thereof. The mounting face 225 is a flat face. In a state in which rotation of the support shaft 22 with respect to the first side plate 21A is restricted, the mounting face 225 faces upward (conveyance path side) and is disposed horizontally.

The mounting face 225 includes two positioning recesses 226a and 226b as positioning portions for positioning the sensor holder 23. Of the two positioning recesses 226a and 226b, the positioning recess 226a has a round shape and serves as a main reference for positioning. The other positioning recess 226b has a slot shape and serves as a sub-reference for positioning. The mounting face 225 further has two screw holes 227 for mounting the sensor holder 23.

As illustrated in FIG. 11, the sensor holder 23 includes a base portion 230 attached to the mounting face 225 of the support shaft 22, and a sensor mounting portion 231 to which the position sensor 30 is mounted. The base portion 230 and the sensor mounting portion 231 are orthogonal to each other. When the base portion 230 is disposed horizontally, the sensor mounting portion 231 extends vertically downward from the base portion 230. The base portion 230 includes two positioning projections 232, as positioning portions, to be inserted into the positioning recesses 226a and 226b in the mounting face 225. When the positioning projections 232 are inserted into the positioning recesses 226a and 226b, the sensor holder 23 is prevented from moving horizontally (in a direction parallel to the mounting face 225) with respect to the support shaft 22. At this time, since the base portion 230 is placed on the mounting face 225 of the support shaft 22, movement of the sensor holder 23 in a downward direction (a direction perpendicular to the mounting face 225) with respect to the support shaft 22 is also restricted.

In the present embodiment, the positioning recesses 226a and 226b are provided in both of the support shafts 22 for commonality of components. However, the positioning projections 232 of the sensor holder 23 are inserted into the positioning recesses 226a and 226b of only one of the support shafts 22. In this manner, the sensor holder 23 is positioned with reference to the positioning recesses 226a and 226b of at least one of the support shafts 22. Alternatively, the sensor holder 23 may be positioned with reference to the positioning recesses 226a and 226b of both support shafts 22. In addition, the projection-recess relationship between the positioning portions of the sensor holder 23 and the support shaft 22 may be opposite to that in the present embodiment. That is, the sensor holder 23 may have positioning recesses, and the mounting face 225 of the support shaft 22 may have positioning projections.

As illustrated in FIG. 11, the base portion 230 of the sensor holder 23 has a plurality of screw insertion holes 233 for attaching the sensor holder 23 to the support shafts 22, in a state in which the sensor holder 23 is positioned with respect to the mounting faces 225 of the support shafts 22, screws 28 are inserted into the screw insertion holes 233 of the sensor holder 23 and screwed to the screw holes 227 in the mounting faces 225. Then, the sensor holder 23 is mounted to the mounting faces 225 of the support shafts 22.

Figure 12:
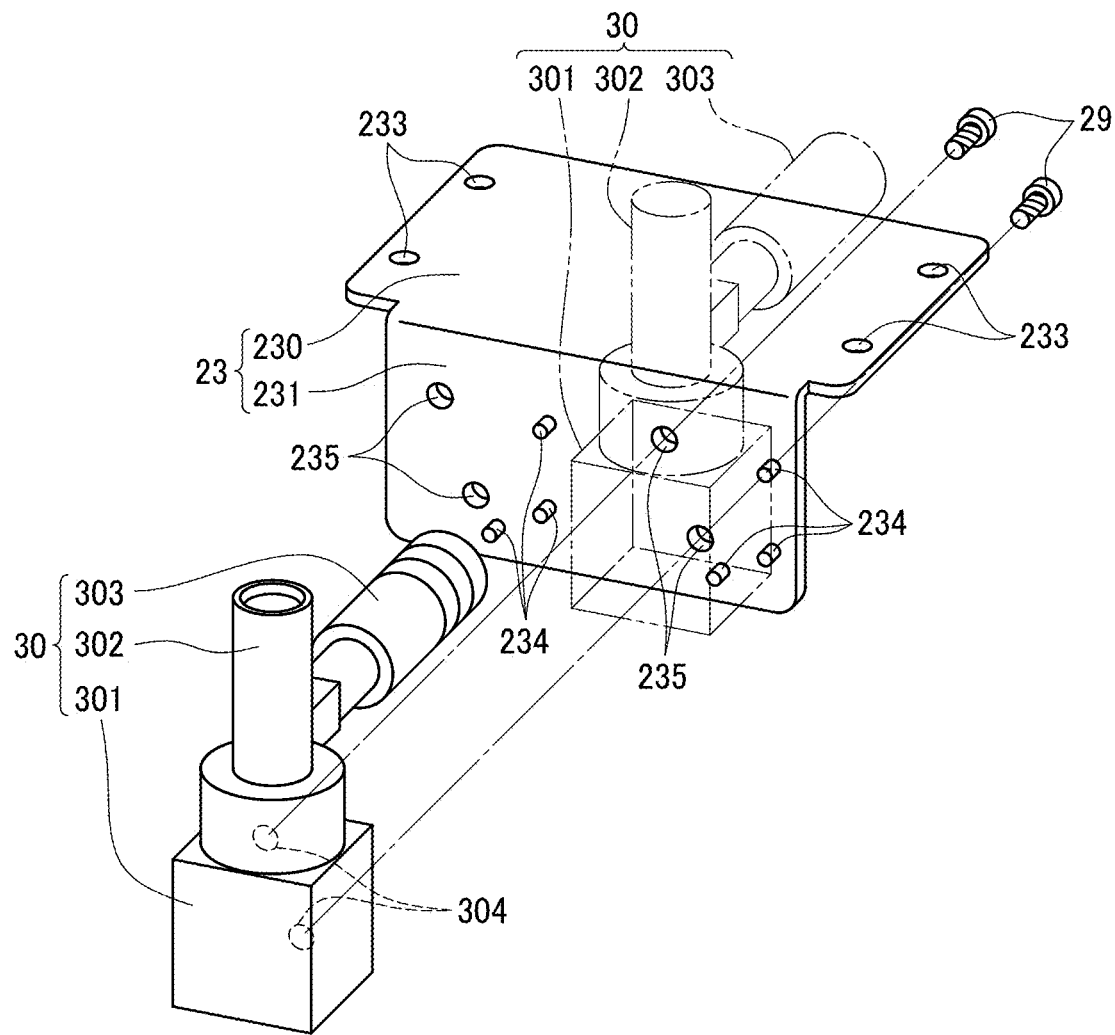
FIG. 12 is an exploded perspective view of the sensor holder and the position sensor to be attached to the sensor holder, according to one embodiment.

FIG. 12 is an exploded perspective view of the sensor holder 23 and the position sensor 30 to be attached to the sensor holder 23.

As illustrated in FIGS. 11 and 12, the sensor mounting portion 231 of the sensor holder 23 includes a plurality of positioning projections 234 as positioning portions for positioning the position sensor 30. As indicated by a chain double-dashed line in FIG. 12, the position sensor 30 is restricted from moving downward and rightward in the drawing by the contact with the positioning projections 234 of the sensor holder 23. Specifically, the position sensor 30 includes a main body 301 including the imaging device 31, a lens unit 302, and an illumination unit 303, and the main body 301 has a hexahedral shape (a cubic shape or a rectangular parallelepiped shape). As the positioning projections 234 contact two planes (the bottom face and the right face in FIG. 12) of the main body 301 orthogonal to each other, movement of the position sensor 30 in a direction orthogonal to the two planes of the main body 301 is restricted.

Further, the sensor mounting portion 231 of the sensor holder 23 includes a plurality of screw insertion holes 235 for mounting the position sensor 30. Relating to this, the main body 301 of the position sensor 30 has a plurality of screw holes 304. In a state in which the position sensor 30 is positioned with respect to the sensor holder 23, screws 29 are inserted into the screw insertion holes 235 of the sensor mounting portion 231 and screwed to the screw holes 304 in the position sensor 30. Then, the position sensor 30 is mounted to the sensor holder 23. In the present embodiment, the two screw insertion holes 235 and the two positioning projections 234 are provided in the sensor mounting portion 231 so that the number of position sensors 30 attached to the sensor holder 23 can be increased to two or the mounting position can be selected.

In the above-described structure according to the present embodiment, in order to mount the position sensor 30 between the side plates 21A and 21B, first, as illustrated in FIG. 8, the two support shafts 22 are inserted into the insertion holes 25 from the outer side of the first side plate 21A. Further, the front ends (the protruding portions 220) of the support shafts 22 in the insertion direction C are inserted into the insertion holes 25 of the second side plate 21B. In the present embodiment, the diameter of the insertion holes 25 of the first side plate 21A are larger on the near side than on the far side in the insertion direction C (see FIG. 9). Therefore, for example, even when the positions of the insertion holes 25 of the side plates 21A and 21B are slightly shifted from each other, the support shaft 22 can be smoothly inserted from the insertion hole 25 of the first side plate 21A into the insertion hole 25 of the second side plate 21B when the support shaft 22 is inclined in the insertion hole 25 of the first side plate 21A.

Next, the mounting faces 225 of the support shafts 22 inserted into the insertion holes 25 are aligned so as to face upward, and the fixing plate 24 is attached from the outer side of the first side plate 21A. At this time, as illustrated in FIG. 10, the fixing plate 24 is disposed such that the rotation preventing protrusions 222 of the support shafts 22 fit in the fitting holes 241 of the fixing plate 24. Then, the screw 26 is screwed to the screw insertion hole 240 in the fixing plate 24, and the screws 27 are screwed to the screw holes 224 in the rotation prevention protrusions 222 of the support shafts 22. Thus, the fixing plate 24 is secured to the first side plate 21A, and the support shafts 22 are secured to the fixing plate 24.

Subsequently, as illustrated in FIG. 12, the position sensor 30 is mounted to the sensor holder 23.

First, the position sensor 30 is brought into contact with the plurality of positioning projections 234 of the sensor holder 23 to be positioned. While this state is maintained, the screws 29 are screwed to the screw holes 304 of the position sensor 30 through the screw insertion holes 235 of the sensor holder 23. Thus, the position sensor 30 is mounted to the sensor holder 23.

Then, the sensor holder 23 to which the position sensor 30 is mounted is mounted on the support shafts 22 secured between the pair of side plates 21A and 21B. First, as illustrated in FIG. 11, the positioning projections 232 of the sensor holder 23 are inserted into the positioning recesses 226a and 226b in the mounting face 225 of one of the support shafts 22, to determine the position thereof. Next, the screws 28 are screwed to the screw holes 227 in the mounting face 225 through the screw insertion holes 233 of the sensor holder 23, and the sensor holder 23 is mounted on each support shaft 22. Thus, the mounting operation of the position sensor 30 is completed.

As described above, in the present embodiment, the position sensor 30 can be mounted while the position of each member is determined. Accordingly, the position sensor 30 can be easily and accurately mounted without strict dimension management of components or position adjustment after the mounting.

That is, in the present embodiment, as the support shafts 22 supporting the position sensor 30 are inserted into the insertion holes 25 in the pair of side plates 21A and 21B, the positions of the support shafts 22 in a direction (radial direction) intersecting the insertion direction C are determined. In addition, in a state in which the support shafts 22 are inserted into the insertion holes 25, the support shaft 22 are secured to the first side plate 21A via the fixing plate 24. Then, the positions of the support shafts 22 with respect to the first side plate 21A in the insertion direction C and the direction opposite thereto (axial direction) are determined. Further, the rotation prevention protrusions 222 at the rear ends of the support shafts 22 are fitted into the fitting holes 241 of the fixing plate 24. This fitting determines the position of the support shafts 22 with respect to the first side plate 21A in the rotational direction about the axes along the insertion direction C.

As described above, in the present embodiment, the paired side plates 21A and 21B have the insertion holes 25 into which the support shafts 22 are inserted to position the support shafts 22 in the direction intersecting the insertion direction C. Additionally, the fixing plate 24 functions as a positioning portion for positioning the support shafts 22 in the insertion direction C and the direction opposite thereto and in the rotational direction about the axis along the insertion direction C with respect to the first side plate 21A. With this structure, the positions of the support shafts 22 can be easily determined by inserting the support shafts 22 into the insertion holes 25 and attaching the fixing plate 24 to the first side plate 21A.

Figure 13:
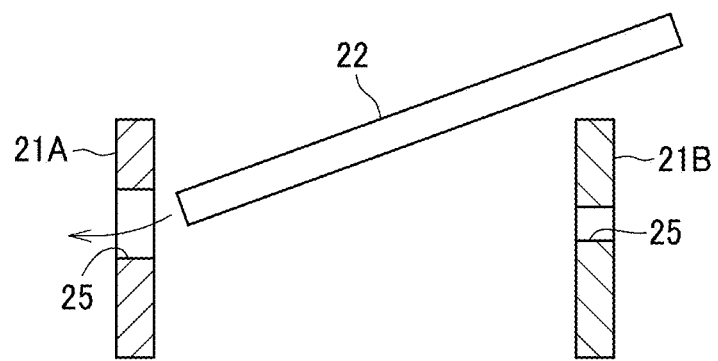
FIG. 13 is a side view of a comparative structure in which a support shaft is attached to a pair of side plates from an inner side.
Figure 14:
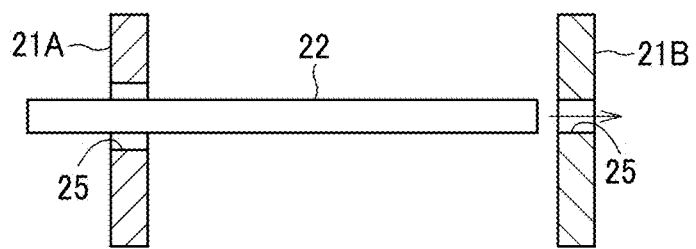
FIG. 14 is a side view of the comparative structure in a state after the support shaft is inserted into one of the side plate in FIG. 13.
Figure 15:
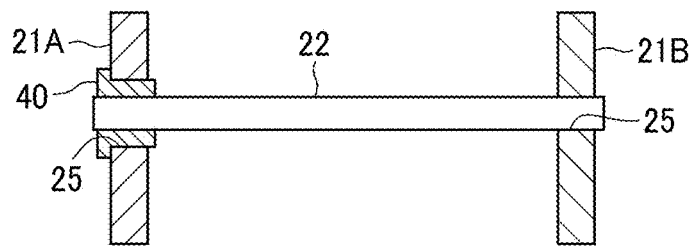
FIG. 15 is a side view of the comparative example in which a bearing is used to secure the support shaft attached to the side plates from the inner side.

In addition, in the present embodiment, each support shaft 22 is inserted into the insertion hole 25 from the outer side of the first side plate 21A. This configuration is advantageous in reducing the number of attachment components and facilitating the mounting work as compared with a configuration in which each support shaft 22 is inserted into the insertion hole 25 from the inner side (opposing side) of the first side plate 21A as illustrated in FIG. 13. Specifically, in the comparative example illustrated in FIG. 13, the support shaft 22 is inclined, and the front end thereof is inserted into the insertion hole 25 from the inner side of the first side plate 21A. After that, as illustrated in FIG. 14, the support shaft 22 is disposed horizontal, and the rear end thereof is inserted into the insertion hole 25 of the second side 21B. In such a mounting method, the insertion hole 25 in the first side plate 21A has a diameter larger than that of the support shaft 22 since the support shaft 22 is inserted into the insertion hole 25 in an inclined posture. Therefore, in a state in which the support shaft 22 is horizontally disposed, as illustrated in FIG. 15, another member such as a bearing 40 for supporting the rear end of the support shaft 22 with respect to the insertion hole 25 of the first side plate 21A is used. By contrast, in the present embodiment, since the support shaft 22 is inserted into the insertion hole 25 from the outer side of the first side plate 21A, the insertion hole 25 of the first side plate 21A can have the same size as the support shaft 22, and there is no need to separately provide a bearing or the like. Therefore, the support shaft 22 can be easily attached with a small number of parts. Note that the present disclosure does not exclude a configuration in which the support shaft 22 is inserted from the inner side of the first side plate 21A as illustrated in FIGS. 13 to 15. A member such as the bearing 40 may be provided, or such a configuration may be adopted.

In addition, in the present embodiment, since the support shafts 22 can be inserted from the insertion holes 25 of the same one (the first side plate 21A) of the pair of side plates 21A and 21B to the insertion hole 25 of the other side plate (the second side plate 21B), the support shafts 22 can be attached easily. For example, there may an obstacle on the second side plate 21B side that makes it difficult to insert the support shafts 22 and screwing the support shafts 22 from the second side plate 21B side. In such a case, the mounting work is facilitated by inserting and screwing the support shafts 22 from the first side plate 21A side. In addition, since it is not necessary to change the insertion direction for each support shaft 22, work efficiency is also improved.

Further, in the present embodiment, as the support shafts 22 are secured to the first side plate 21A via the fixing plate 24, the support shafts 22 are positioned with respect to the first side plate 21A in the insertion direction C and the direction opposite thereto (positioning in the axial direction). By contrast, with respect to the second side plate 21B, since only the front end of each support shaft 22 is inserted into the insertion hole 25 (see FIG. 9), positioning of each support shaft 22 in the insertion direction C and the direction opposite thereto (positioning in the axial direction) is not performed. Thus, in the present embodiment, the support shafts 22 are not positioned in the insertion direction C and in the direction opposite thereto (positioned in the axial direction) with respect to the second side plate 21B and are allowed to move in the axial direction with respect to the second side plate 21B. With this structure, even if the support shafts 22 expand or contract in the axial direction due to a temperature rise after attachment, the side plates 21A and 21B are less likely to be directly affected by the expansion and contraction of the support shafts 22. This feature can inhibit deformation such as bending of the side plates 21A and 21B caused by expansion and contraction of the support shafts 22, thereby improving positional accuracy of the support shafts 22.

Further, as described above, since the support shafts 22 are positioned with respect to the same side plate (the first side plate 21A) via the fixing plate 24, the positioning accuracy of the support shafts 22 improves. That is, since the positioning of the support shafts 22 in the insertion direction C and the direction opposite thereto is performed with reference to the same side plate (first side plate 21A), the accuracy of positioning can be high compared with a case in which the positioning is performed with reference to different side plates. As described above, in the present embodiment, since the support shafts 22 can be positioned with high accuracy, the mounting accuracy of the position sensor 30 supported by the support shafts 22 are also improved.

In addition, the sensor mounting structure of the present embodiment facilitates installation of an additional position sensor 30, maintenance work, and the like. For example, additional insertion holes 25 for the additional position sensor are provided in advance in each of the side plates 21A and 21B so that, when necessary, another support shaft 22 is inserted into the additional insertion holes 25 from the outer side of the first side plate 21A and easily attached. Further, since the sensor holder 23 can be screwed and secured to the added support shaft 22 from above, the mounting work can be easily performed. Similarly, the position sensor 30 can be easily replaced or rearrangement from above the support shafts 22.

Figure 16:
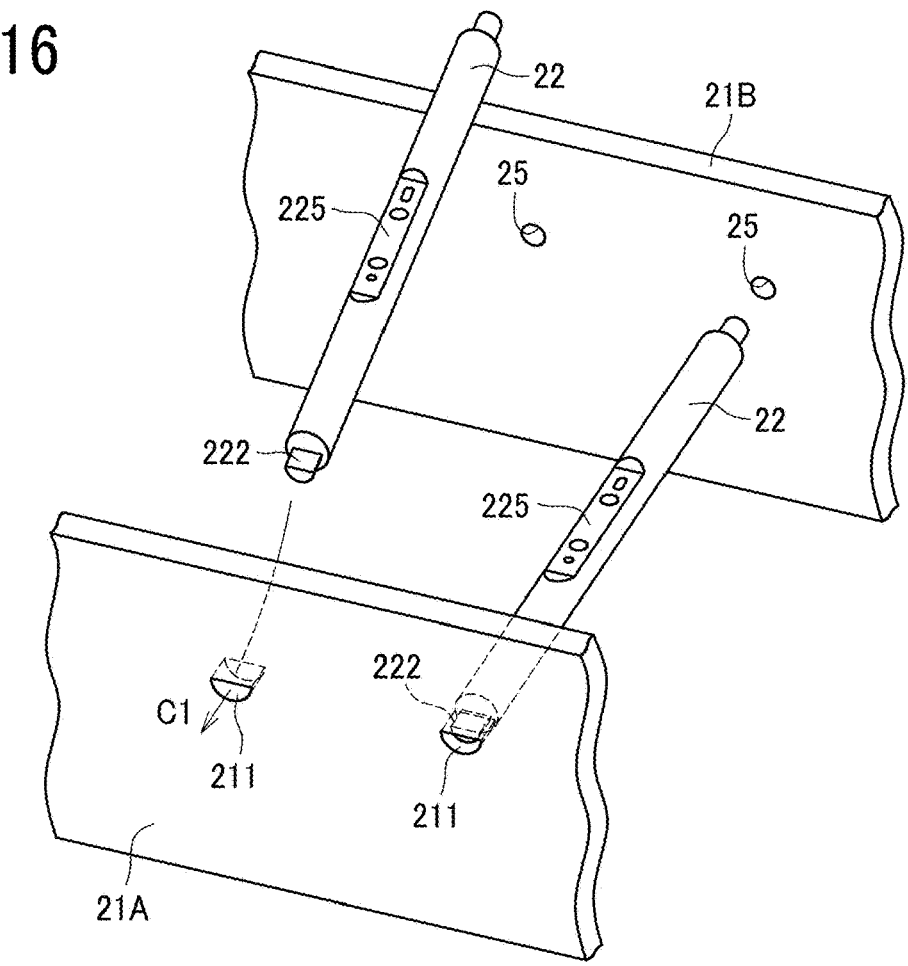
FIG. 16 is a perspective view of a sensor mounting structure in which a fitting hole for positioning a support shaft in a rotational direction is provided in a side plate, according to a modification.

Further, as in the example illustrated in FIG. 16, fitting holes 211 (positioning portions in the rotational direction) having a D-shaped cross section to be fitted to the rotation prevention protrusions 222 of the support shafts 22 may be directly provided in one (the side plate 21A) of the pair of side plates 21A and 21B. In this case, the rotation prevention protrusion 222 on each of the support shafts 22 and the fitting hole 211 in the side plate 21A together serve as the positioning portion for positioning the support shaft 22 in the rotational direction. In the example illustrated in FIG. 16, the support shaft 22 is inserted into the fitting hole 211 in the direction indicated by arrow C1 (insertion direction C1) from the inner side of the side plate side 21A. Each fitting hole 211 in the side plate 21A serves as both the positioning portion for the rotational direction and the positioning portion for the radial direction (the insertion hole 25). In other words, each fitting hole 211 fits with the rotation prevention protrusion 222 in the support shaft 22 to restrict the rotation of the support shaft 22, and supports the support shaft 22 in the direction intersecting the insertion direction C1. In this case, when the rotation prevention protrusion 222 of the support shaft 22 is inserted into the fitting hole 211 from the inner side of the side plate side 21A, the position of the support shaft 22 is determined in the rotational direction and in a direction (radial direction) intersecting the insertion direction C1. Further, as the front end face of the support shaft 22 in the insertion direction C1 contacts the side plate side 21A, the position of the support shaft 22 is determined also in the insertion direction C1 (axial direction). In this case, at least one of the pair of side plates 21A and 21B is movable toward and away from the other. After the front end of each support shaft 22 in the insertion direction C1 is inserted into the fitting hole 211 of the side plate 21A, the other side plate 21B is moved toward the rear end of each support shaft 22, so as to insert the rear end of each support shaft 22 into the insertion hole 25 of the side plate 21B. Thus, each support shaft 22 is sandwiched between the pair of side plates 21A and 21B, and the support shafts 22 are positioned with respect to the side plates 21A and 21B in the insertion direction C1 and the direction opposite thereto.

Figure 17:
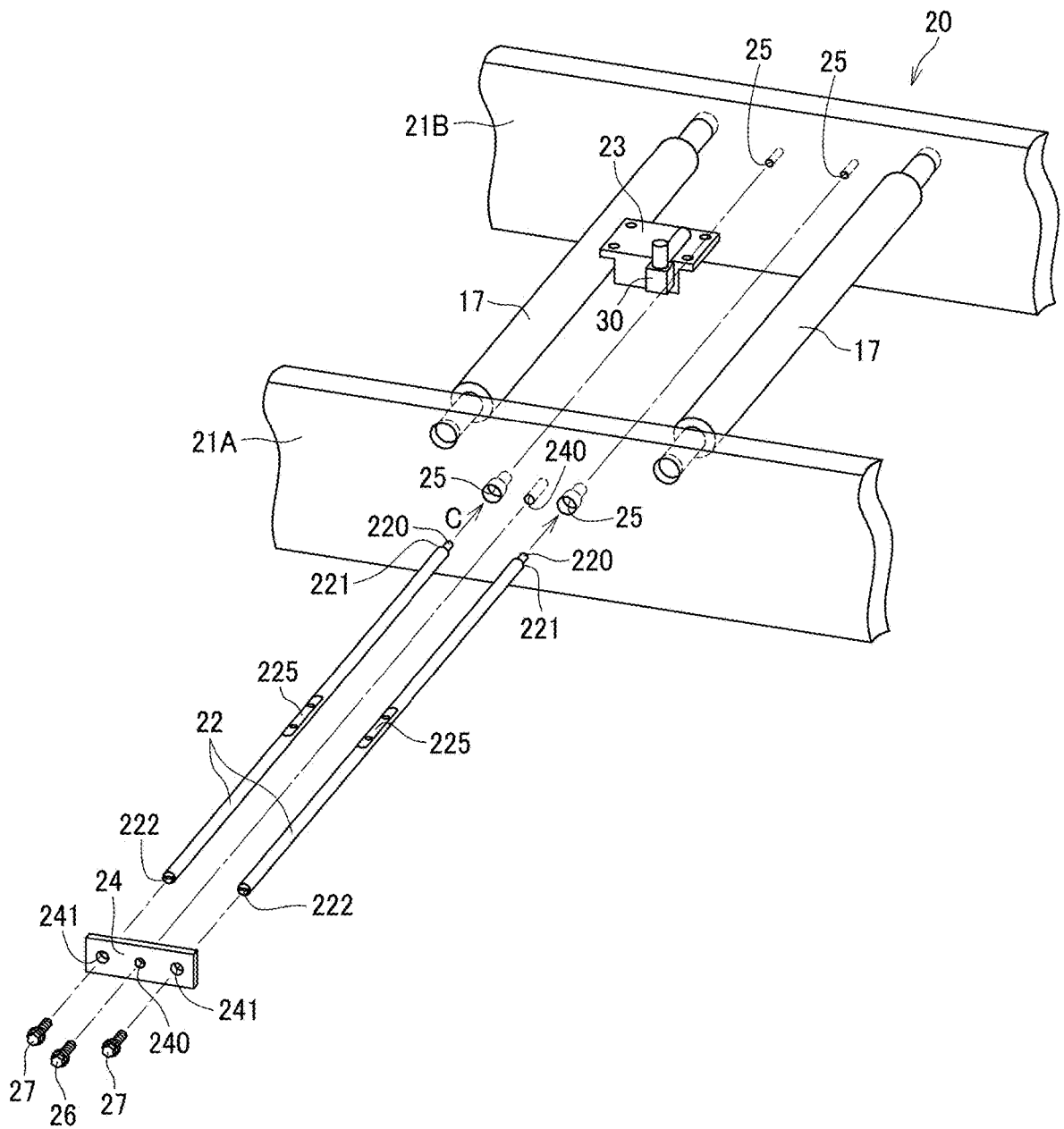
FIG. 17 is a perspective view of a sensor mounting structure in which a front end of a support shaft contacts a side plate and is positioned, according to another modification.

Alternatively, the position of each support shaft 22 in the in the insertion direction C may be determined as in another example illustrated in FIG. 17. Specifically, in FIG. 17, when the protruding portion 220 at the front end of each support shaft 22 in the insertion direction C is inserted into the insertion hole 25 of the second side plate 21B, the end face of the large-diameter portion 221 on the front end side (the protruding portion 220 side) of each support shaft 22 contacts the rim of the insertion hole 25 of the second side plate 21B (the inner face of the second side plate 21B enclosing the insertion hole 25), thereby determining the position of each support shaft 22 in the insertion direction C. In this case, each insertion hole 25 of the second side plate 21B has a diameter larger than the diameter of the projecting portions 220 and smaller than the diameter of the end face of the large-diameter portion 221 so that the end face of the large-diameter portions 221 of the support shaft 22 contacts the rim of the insertion hole 25.

Figure 18:
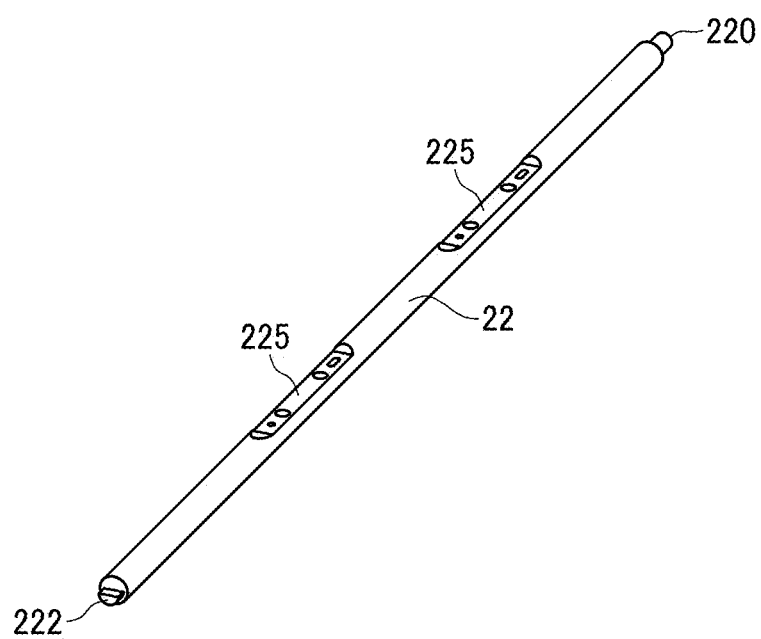
FIG. 18 is a perspective view of a support shaft including two mounting faces, according to another modification.

Further, as in the example illustrated in FIG. 18, the support shaft 22 may include a plurality of mounting faces 225 at different positions in the axial direction of the support shaft 22. For example, in a configuration in which the width-direction reference position for determining the width-direction reference position of the sheet S in the first image forming device 3 is on the near side (left side in FIG. 18), in the second image forming device 4, in which the sheet S is thereafter reversed and conveyed, the width-direction reference position for the sheet S is on the far side (right side in FIG. 18). Accordingly, the sensor holder 23 of the first image forming device 3 may be attached to the mounting face 225 on the near side of the support shaft 22, and the sensor holder 23 of the second image forming device 4 may be attached to the mounting face 225 on the far side of the support shaft 22. In this manner, since the support shaft 22 includes the plurality of mounting faces 225, it is possible to appropriately select the position of the position sensor 30 according to the width-direction reference position of the sheet S or the like.

Figure 19:
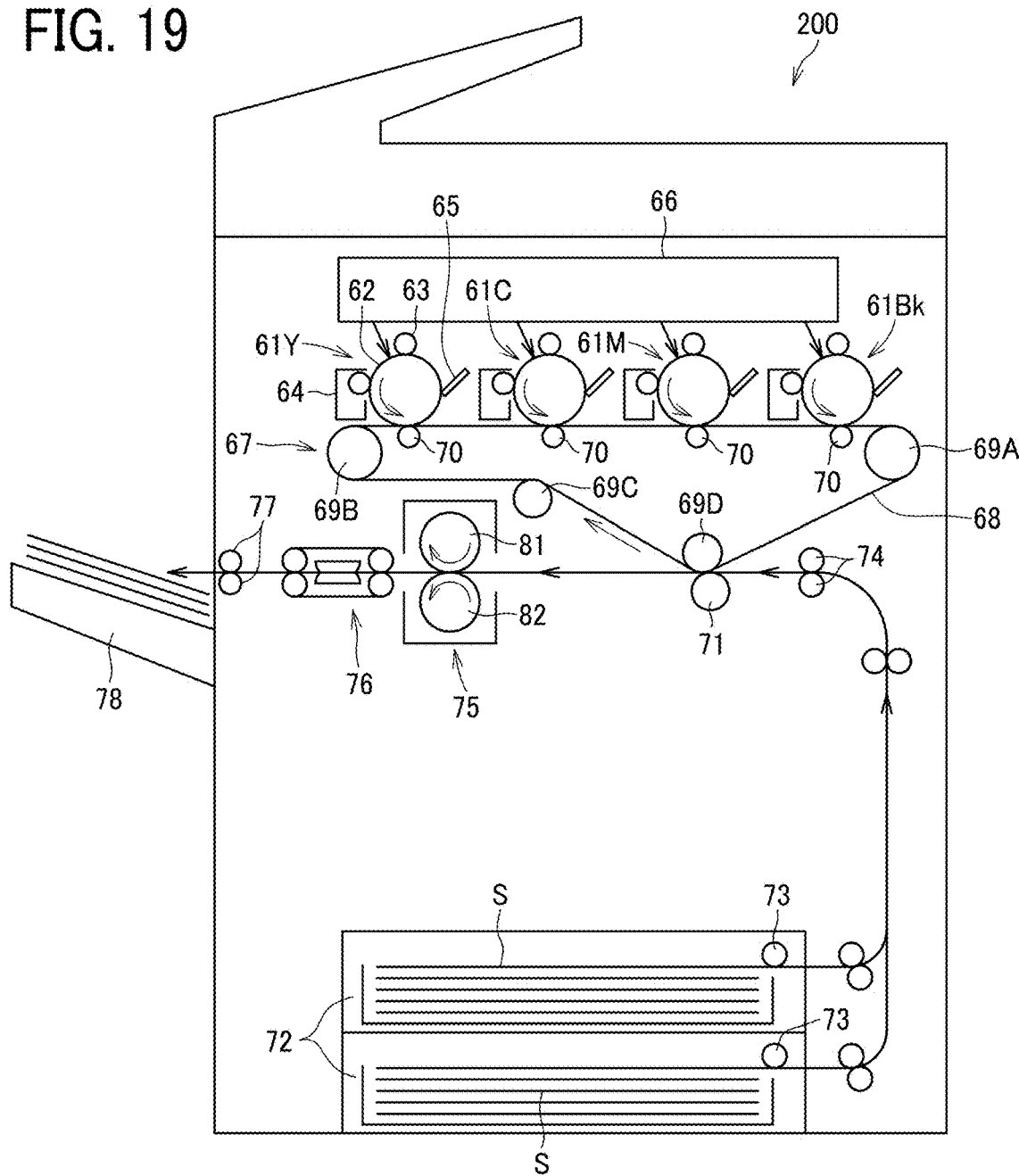
FIG. 19 is a diagram illustrating an overall configuration of an electrophotographic image forming apparatus according to another embodiment.

The embodiments of the present disclosure have been described above using an example of the conveyor mounted in an inkjet image forming apparatus. However, aspects of the present disclosure are applicable to, in addition to the above-described inkjet image forming apparatus, a conveyor mounted in an electrophotographic image forming apparatus as illustrated in FIG. 19. Hereinafter, a configuration of an electrophotographic image forming apparatus to which aspects of the present disclosure are applied will be described.

An image forming apparatus 200 illustrated in FIG. 19 is a tandem image forming apparatus including four process units 61Y, 61C, 61M, and 61Bk as image forming units (image forming devices).

Each of the process units 61Y, 61C, 61M, and 61Bk includes a drum-shaped photoconductor 62 serving as a latent image bearer, a charging roller 63 serving as a charger that charges the photoconductor 62, a developing device 64 that forms a toner image on the photoconductor 62, and a cleaning blade 65 serving as a cleaning device that cleans the surface of the photoconductor 62.

In FIG. 19, an exposure device 66 is disposed above the process units 61Y, 61C, 61M, and 61Bk. The exposure device 66 includes a light source, a polygon mirror, an f-θ lens, and reflection mirrors to irradiate the surfaces of the photoconductors 62 with laser beams according to the image data.

In FIG. 19, a transfer device 67 is disposed below the process units 61Y, 61C, 61M, and 61Bk. The transfer device 67 includes an intermediate transfer belt 68 formed of an endless belt as a transfer member, primary transfer rollers 70 each of which is disposed in contact with corresponding one of the photoconductors 62, forming a primary transfer nip therebetween, and a secondary transfer roller 71 disposed in contact with the intermediate transfer belt 68, forming a secondary transfer nip therebetween.

The image forming apparatus 200 includes sheet feeding trays 72 that store sheets S as recording media, sheet feeding rollers 73 that feed the sheets S from the sheet feeding trays 72, and a timing roller pair 74 that conveys the fed sheets S to the secondary transfer nip at a predetermined timing. The image forming apparatus 200 further includes a fixing device 75 that fixes images on the sheets S, a cooling device 76 that cools the sheets S, an ejection roller pair 77 that discharges the sheets S to the outside of the apparatus, and an output tray 78 on which the ejected sheets S are placed.

The image forming apparatus 200 illustrated in FIG. 19 operates as follows.

When an image forming operation is started, the photoconductors 62 of the process units 61Y, 61C, 61M, and 61Bk rotate in a counterclockwise direction in FIG. 19, and the charging rollers 63 uniformly charge the surfaces of the photoconductors 62 to a predetermined polarity. Then, the exposure device 66 directs laser beams onto the charged surfaces of the photoconductors 62 according to image data of a document read by a scanner. Thus, electrostatic latent images are formed on the photoconductors 62. Note that the image data according to which each photoconductor 62 is exposed is single-color image data obtained by separating full-color image data into individual color components of yellow, cyan, magenta, and black. The electrostatic latent images formed on the photoconductors 62 are developed into toner images with toner of respective colors supplied by the developing devices 64.

In the transfer device 67, one of a plurality of rollers 69A to 69D that supports the intermediate transfer belt 68 rotates as a drive roller, thereby rotating the intermediate transfer belt 68 in the direction indicated by an arrow appended to the transfer device 67 in FIG. 19. Each primary transfer roller 70 is applied with a voltage having a polarity opposite a charging polarity of the toner, in constant-voltage or constant-current control, so as to generate a transfer electrical field in each primary transfer nip between the primary transfer roller 70 and the corresponding photoconductor 62. The transfer electric fields generated at the primary transfer nips sequentially transfer and superimpose the respective toner images from the photoconductors 62 one on another on the intermediate transfer belt 68. Thus, a full-color toner image is formed on the intermediate transfer belt 68. Residual toner on the photoconductor 62 not transferred onto the intermediate transfer belt 68 is removed by the cleaning blade 65.

In accordance with rotation of the intermediate transfer belt 68, the full-color toner image transferred onto the intermediate transfer belt 68 reaches the secondary transfer nip (position of the secondary transfer roller 71) and is transferred, at the secondary transfer nip, onto the sheet S conveyed by the timing roller pair 74. The sheet S is supplied from the sheet feeding tray 72. In the sheet feeding tray 72, after an instruction to start a printing operation is given, the sheets S are fed one by one as the sheet feeding roller 73 rotates. The timing roller pair 74 halts the supplied sheet P and then conveys the sheet P to the secondary transfer nip timed to coincide with arrival, at the secondary transfer nip, of the full-color toner image on the intermediate transfer belt 68. At this time, the secondary transfer roller 71 is applied with a transfer voltage having a polarity opposite to the charging polarity of the toner image on the intermediate transfer belt 68, and the transfer electrical field generated in the secondary transfer nip transfers the toner image from the intermediate transfer belt 68 onto the sheet S.

Thereafter, the sheet S is conveyed to the fixing device 75. The fixing device 75 heats and presses the toner image to the sheet S with a fixing roller 81 and a pressure roller 82, thereby fixing the toner image on the sheet S. Then, the sheet S is conveyed to the cooling device 76 and cooled, after which the ejection roller pair 77 ejects the sheet S to the output tray 78. Thus, a series of image forming operations is completed.

The cooling device 76 in the image forming apparatus 200 has the following configuration.

Figure 20:
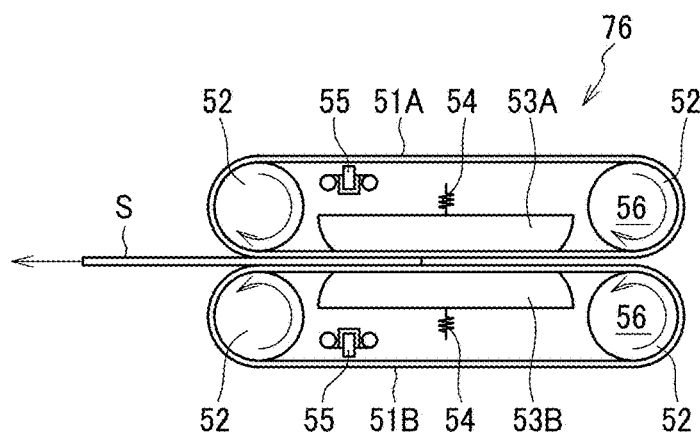
FIG. 20 is a diagram illustrating a configuration of a cooling device in the image forming apparatus illustrated in FIG. 19.

As illustrated in FIG. 20, the cooling device 76 includes a pair of conveyor belts 51A and 51B. Each of the conveyor belts 51A and 51B is an endless belt and is stretched by a pair of conveyance rollers 52. At least one of the conveyance rollers 52 is a drive roller that is rotated by a drive source such as a motor. As the conveyance rollers 52, the conveyor belts 51A and 51B rotate. As a result, the sheet S is conveyed while being nipped by the conveyor belts 51A and 51B.

As illustrated in FIG. 19, inside the pair of conveyor belts 51A and 51B, cooling members 53A and 53B are disposed, respectively. The cooling members 53A and 53B are pressed against the inner peripheral surfaces of the conveyor belts 51A and 51B by springs 54 serving as pressing members. With this configuration, the sheet S conveyed between the conveyor belts 51A and 51B, is cooled from both sides by the cooling members 53A and 53B while being conveyed by the rotating conveyor belts 51A and 51B.

In the cooling device 76 including the pair of conveyor belts 51A and 51B as described above, when one or more of the conveyance rollers 52 respectively supporting the conveyor belts 51A and 51B are eccentric, there is a concern that the conveyor belts 51A and 51B may meander (deviate in the sheet width direction). Therefore, the cooling device 76 illustrated in FIG. 20 includes position sensors 55 respectively disposed inside the conveyor belts 51A and 51B, to detect the positions of the conveyor belts 51A and 51B. These position sensors 55 detect the surfaces of the conveyor belts 51A and 51B to determine the presence or absence of meandering of the conveyor belts 51A and 51B, When the conveyor belts 51A and 51B meander, the positions (positions in the sheet width direction) of the conveyor belts 51A and 51B are corrected by meandering correction units 56 provided to the conveyance rollers 52.

As described above, in the cooling device 76 including the position sensors 55 to detect the meandering of the conveyor belts 51A and 51B, the mounting accuracy of the position sensors 55 affects the detection accuracy of the meandering. For this reason, it is preferable to apply one of the sensor mounting structures (illustrated in FIGS. 7 to 12 and 16 to 18) according to the present disclosure to the cooling device 76 as well as the conveyance device 20 according to the above-described embodiment. Thus, the position sensors can be easily and accurately mounted, and the detection accuracy of meandering is also improved. Further, aspects of the present disclosure are applicable to, in addition to the conveyance device functioning as the cooling device 76, a conveyance device other than the cooling device, such as a transfer device 67 including an intermediate transfer belt 68 illustrated in FIG. 19.

Although the embodiments of the present disclosure have been described above, the present disclosure is not limited to the above-described embodiments, and appropriate design changes can be made without departing from the scope of the invention.

The term "liquid discharge apparatus" used in this specification also represents an apparatus including a liquid discharge head or a liquid discharge device to discharge liquid by driving the liquid discharge head. The term "liquid discharge apparatus" used in this specification includes, in addition to apparatuses to discharge liquid to materials to which the liquid adheres, for example, apparatuses to discharge the liquid into gas (air) or liquid.

The "liquid discharge apparatus" may include at least one of devices for feeding, conveying, and ejecting a material to which liquid adheres. The "liquid discharge apparatus" may further include at least one of a device for pre-processing (or pretreatment) and a device for post-processing (or after treatment). The liquid discharge apparatus may be, for example, an image forming apparatus to form an image on a sheet by discharging ink, or a three-dimensional fabricating apparatus (solid-object fabricating apparatus) to discharge a fabrication liquid to a powder layer in which powder material is formed in layers, so as to form a three-dimensional fabrication object (solid fabrication object).

The "liquid discharge apparatus" is not limited to an apparatus to discharge liquid to visualize meaningful images, such as letters or figures. For example, the liquid discharge apparatus may be an apparatus to form meaningless images, such as meaningless patterns, or fabricate three-dimensional images.

The term "liquid discharge apparatus" may represent an apparatus to relatively move the liquid discharge head and the material onto which liquid can adhere. However, the liquid discharge apparatus is not limited to such an apparatus. Specific examples include a serial-type liquid discharge apparatus including a liquid discharge head that ejects liquid while moving in the sheet width direction, and a line-type liquid discharge apparatus (see FIG. 3) including a liquid discharge head that ejects liquid without moving in the sheet width direction.

In addition, the "liquid discharge apparatus" includes a treatment liquid application apparatus that discharges a treatment liquid onto a surface of a sheet for the purpose of modifying the surface of the sheet, and an injection granulation apparatus that injects a composition liquid in which a raw material is dispersed in a solution through a nozzle to granulate fine particles of the raw material.

In addition, the term "liquid discharge head" refers to a functional component that discharges or ejects liquid from a nozzle. The liquid to be discharged from the nozzle of the liquid discharge head is not limited to a particular liquid as long as the liquid has a viscosity or surface tension to be discharged from the liquid discharge head. However, preferably, the viscosity of the liquid is not greater than 30 MPa's under ordinary temperature and ordinary pressure or by heating or cooling. Examples of the liquid include a solution, a suspension, or an emulsion including, for example, a solvent, such as water or an organic solvent, a colorant, such as dye or pigment, a functional material, such as a polymerizable compound, a resin, a surfactant, a biocompatible material, such as DNA, amino acid, protein, or calcium, and an edible material, such as a natural colorant. Such a solution, a suspension, or an emulsion can be used for, e.g., inkjet ink, surface treatment solution, a liquid for forming components of electronic element or light-emitting element or a resist pattern of electronic circuit, or a material solution for three-dimensional fabrication.

Examples of a source for generating energy to discharge liquid include a piezoelectric actuator (a laminated piezoelectric element or a thin-film piezoelectric element), a thermal actuator that employs an electrothermal transducer element, such as a heat element, and an electrostatic actuator including a diaphragm and opposed electrodes.

In this specification, the term "head unit" refers to an assembly in which functional components and mechanisms are integral with the liquid discharge head, and includes an assembly of components related to liquid discharge. For example, the "head unit" includes a combination of the head and at least one of a head tank, a carriage, a supply unit, a maintenance unit, a main-scanning moving mechanism, and a liquid circulator. The "head unit" may include one liquid discharge head or a plurality of liquid discharge heads as in the above-described embodiment.

In present specification, the terms "combined" or "integrated" mean attaching the liquid discharge head and the functional parts (or mechanism) to each other by fastening, screwing, binding, or engaging and holding one of the liquid discharge head and the functional parts to the other movably relative to the other. The liquid discharge head and the functional part(s) or device(s) may be detachably attached to each other.

For example, the liquid discharge head and the head tank are integral parts of the head unit. Alternatively, the liquid discharge head may be coupled with the head tank through a tube or the like to become one unit, A unit including a filter can be added at a position between the head tank and the liquid discharge head of the head unit. In yet another example, the liquid discharge head and the carriage are combined as the "head unit." As yet another example, in the head unit, the liquid discharge head and the main scanning moving unit are combined into a single unit. The liquid discharge head is movably held by a guide that is a part of the main-scanning moving mechanism. The liquid discharge head, the carriage, and the main-scanning moving mechanism may be integral parts of a single unit.

As yet another example, in the head unit, a cap that is a part of the maintenance unit is secured to the carriage mounting the liquid discharge head such that the liquid discharge head, the carriage, and the maintenance unit are integral parts of the head unit. As yet another example, a tube is coupled to the liquid discharge head to which either the head tank or a channel member is attached such that the liquid discharge head and the supply unit are integral parts of the head unit.

The main-scan moving mechanism may be a guide only. The supply unit can be a tube(s) only or a loading unit only.

The term "material onto which liquid adheres" denotes, for example, a conveyed object that is a material to which liquid adheres at least temporarily, a material to which liquid adheres and is fixed, or a material to which liquid adheres and permeates. Examples of the "material to which liquid can adhere" include recording media, such as paper, recording paper, recording sheets, film, and cloth; electronic components, such as electronic substrate and a piezoelectric element; and media, such as a powder layer, an organ model, and a testing cell. The "material to which liquid can adhere" includes any material to which liquid adheres, unless otherwise specified.

The above-mentioned "material to which liquid adheres" may be any material, such as paper, thread, fiber, cloth, leather, metal, plastic, glass, wood, ceramics, or the like, as long as liquid can temporarily adhere.

In addition, the "sheet" may be a continuous long sheet (roll paper or the like) or a cut sheet (cut paper or the like) cut into a predetermined size in advance. Furthermore, aspects of the present disclosure are also applicable to an apparatus that conveys a conveyed object, such as a belt, other than a sheet.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:
1. A conveyor, comprising:
   a conveyance roller configured to convey a conveyed object;
   a pair of roller supports opposing to each other and supporting both ends of the conveyance roller in an axial direction of the conveyance roller;
   a position sensor configured to detect a position of the conveyed object; and
   a sensor support supporting the position sensor, wherein each roller support of the pair of roller supports has an insertion hole into which the sensor support is inserted,
   the sensor support is positioned:
      by the insertion hole in a direction intersecting an insertion direction of the sensor support, with respect to one roller support of the pair of roller supports only in the direction intersecting the insertion direction, and by an end of the sensor support, with respect to another roller support of the pair of roller supports, in the insertion direction, a direction opposite to the insertion direction, and a rotational direction about an axis along the insertion direction, the insertion hole of the one roller support of the pair of roller supports has a circular cross section, and the insertion hole of the other roller support of the pair of roller supports has a non-circular cross section.

2. The conveyor according to claim 1, wherein the sensor support is inserted into the insertion hole from a side of the pair of roller supports opposite to an opposing side of the pair of roller supports.

3. The conveyor according to claim 1, further comprising:
a plurality of sensor supports including the sensor support, wherein
each roller support of the pair of roller supports has a plurality of insertion holes including the insertion hole, and
the plurality of sensor supports is inserted from the plurality of insertion holes of a same roller support of the pair of roller supports to the plurality of insertion holes of the other roller support of the pair of roller supports, respectively.

4. The conveyor according to claim 1, further comprising:
a fixing plate having a fitting hole in which the end of the sensor support fits, wherein
the sensor support includes a support shaft inserted into the insertion hole of each roller support of the pair of roller supports,
the fixing plate is attached to the other roller support of the pair of roller supports, and
the support shaft is positioned by the fixing plate with respect to the other roller support of the pair of roller supports in the insertion direction, the direction opposite to the insertion direction, and the rotational direction.

5. The conveyor according to claim 1, further comprising:
a sensor holder holding the position sensor; and
another sensor support supporting the position sensor, wherein
the sensor holder is attached to the sensor support and the other sensor support and extends across the sensor support and the other sensor support.

6. The conveyor according to claim 5, wherein
each of the sensor support and the other sensor support includes a mounting face to which the sensor holder is mounted, and
the respective mounting faces of the sensor support and the other sensor support face a same direction in the rotational direction.

7. A liquid discharge apparatus, comprising:
the conveyor according to claim 1; and
a liquid discharge head configured to discharge a liquid onto the conveyed object conveyed by the conveyor.

8. The liquid discharge apparatus according to claim 7, wherein the position sensor is disposed opposite to the liquid discharge head with respect to a conveyance path through which the conveyed object is conveyed.

9. A conveyor, comprising:
a conveyance roller configured to convey a conveyed object;
a pair of roller supports opposing to each other and supporting both ends of the conveyance roller in an axial direction of the conveyance roller;
a position sensor configured to detect a position of the conveyed object;
a sensor support supporting the position sensor; and
a fixing plate having a fitting hole in which the end of the sensor support fits, wherein
each roller support of the pair of roller supports has an insertion hole into which the sensor support is inserted,
the sensor support is positioned:
by the insertion hole in a direction intersecting an insertion direction of the sensor support,
with respect to one roller support of the pair of roller supports only in the direction intersecting the insertion direction, and
by an end of the sensor support, with respect to another roller support of the pair of roller supports, in the insertion direction, a direction opposite to the insertion direction, and a rotational direction about an axis along the insertion direction,
the sensor support includes a support shaft inserted into the insertion hole of each roller support of the pair of roller supports,
the fixing plate is attached to the other roller support of the pair of roller supports, and
the support shaft is positioned by the fixing plate with respect to the other roller support of the pair of roller supports in the insertion direction, the direction opposite to the insertion direction, and the rotational direction.

10. The conveyor according to claim 9, wherein the sensor support is inserted into the insertion hole from a side of the pair of roller supports opposite to an opposing side of the pair of roller supports.

11. The conveyor according to claim 9, further comprising:
a plurality of sensor supports including the sensor support, wherein
each roller support of the pair of roller supports has a plurality of insertion holes including the insertion hole, and
the plurality of sensor supports is inserted from the plurality of insertion holes of a same roller support of the pair of roller supports to the plurality of insertion holes of the other roller support of the pair of roller supports, respectively.

12. The conveyor according to claim 9, further comprising:
a sensor holder holding the position sensor; and
another sensor support supporting the position sensor, wherein
the sensor holder is attached to the sensor support and the other sensor support and extends across the sensor support and the other sensor support.

13. The conveyor according to claim 12, wherein
each of the sensor support and the other sensor support includes a mounting face to which the sensor holder is mounted, and
the respective mounting faces of the sensor support and the other sensor support face a same direction in the rotational direction.

14. A liquid discharge apparatus, comprising:
the conveyor according to claim 9; and
a liquid discharge head configured to discharge a liquid onto the conveyed object conveyed by the conveyor.

15. The liquid discharge apparatus according to claim 14, wherein the position sensor is disposed opposite to the liquid discharge head with respect to a conveyance path through which the conveyed object is conveyed.

\* \* \* \* \*